(12) United States Patent
Durham et al.

(10) Patent No.: US 9,419,543 B2
(45) Date of Patent: Aug. 16, 2016

(54) CONTROLLED RESONANCE IN ELECTRICAL POWER DEVICES

(71) Applicant: Opto Generic Devices, Inc., Van Hornesville, NY (US)

(72) Inventors: Ormonde G. Durham, Jordanville, NY (US); Edward E. Lakata, Johnstown, NY (US)

(73) Assignee: Opto Generic Devices, Inc., Van Hornesville, NY (US)

( * ) Notice: Subject to any disclaimer, the term of this patent is extended or adjusted under 35 U.S.C. 154(b) by 24 days.

(21) Appl. No.: 14/370,576

(22) PCT Filed: Jan. 4, 2013

(86) PCT No.: PCT/US2013/020344
§ 371 (c)(1),
(2) Date: Jul. 3, 2014

(87) PCT Pub. No.: WO2013/103865
PCT Pub. Date: Jul. 11, 2013

(65) Prior Publication Data
US 2015/0002068 A1    Jan. 1, 2015

Related U.S. Application Data

(60) Provisional application No. 61/583,337, filed on Jan. 5, 2012.

(51) Int. Cl.
*H02M 7/539*    (2006.01)
*H02P 23/00*    (2016.01)
*H02M 7/48*    (2007.01)

(52) U.S. Cl.
CPC ........... *H02M 7/539* (2013.01); *H02P 23/0004* (2013.01); *H02P 23/0077* (2013.01); *H02M 2007/4818* (2013.01)

(58) Field of Classification Search
CPC ....................................... H02M 7/539
USPC .................... 318/503, 558; 359/237, 326, 328
See application file for complete search history.

(56) References Cited

U.S. PATENT DOCUMENTS

| 4,008,421 | A | | 2/1977 | Bird | |
|---|---|---|---|---|---|
| 4,414,535 | A | * | 11/1983 | Ferriss | G01C 19/60 324/300 |
| 4,575,179 | A | * | 3/1986 | Lee | G02F 1/095 365/10 |
| 4,629,886 | A | * | 12/1986 | Akiyama | G01D 5/38 250/231.16 |
| 5,196,775 | A | | 3/1993 | Harris et al. | |

(Continued)

OTHER PUBLICATIONS

Patent Cooperation Treaty, Notification of Transmittal of the International Search Report and the Written Opinion of the International Searching Authority, or the Declaration for PCT/US13/20344 mailed Mar. 26, 2013, 9 pages.

*Primary Examiner* — Bentsu Ro
(74) *Attorney, Agent, or Firm* — Hoffman Warnick LLC

(57) ABSTRACT

Systems for controlled resonance in electrical power devices are described. A programmed signal processor generates output control signals from input electrical signals based on resonant control parameters for a target power device. Analog electrical control systems for controlled resonance, power devices incorporating controlled resonance, and opto-programmed controllers for use in controlled resonance applications are described, with example embodiments for electromechanical systems with resonant constructive power drive action for electric motors.

24 Claims, 24 Drawing Sheets

(56) References Cited

U.S. PATENT DOCUMENTS

| | | |
|---|---|---|
| 5,665,965 A | 9/1997 | Durham, III |
| 6,087,654 A | 7/2000 | Durham, III |
| 7,204,429 B2 | 4/2007 | Olney |
| 7,797,080 B2 | 9/2010 | Durham, III |
| 7,899,579 B2 | 3/2011 | Durham, III |
| 2005/0278071 A1 | 12/2005 | Durham, III |
| 2010/0085677 A1 | 4/2010 | Rivers, Jr. et al. |
| 2012/0324928 A1 | 12/2012 | Durham et al. |

* cited by examiner

Traditional Digital or Switched (PWM) Amplifier on Inductive Load

AC Line: Analog Fixed Volts Input, Digital Switched Current (or Amps) and Digital Switched Power (or Watts) drawn.

*FIG. 1A*

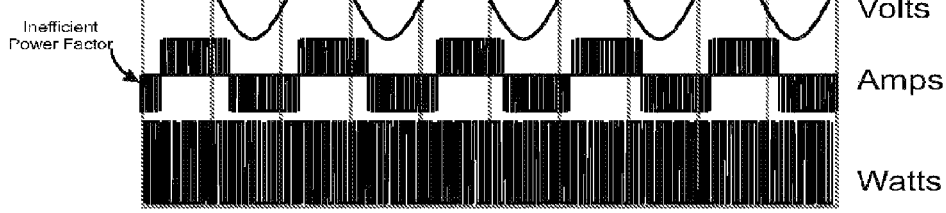

DC Power Supply Fixed DC Volts Input, Digital Switched Current (or Amps) and Digital Switched Power (or Watts) drawn.

*FIG. 1B*

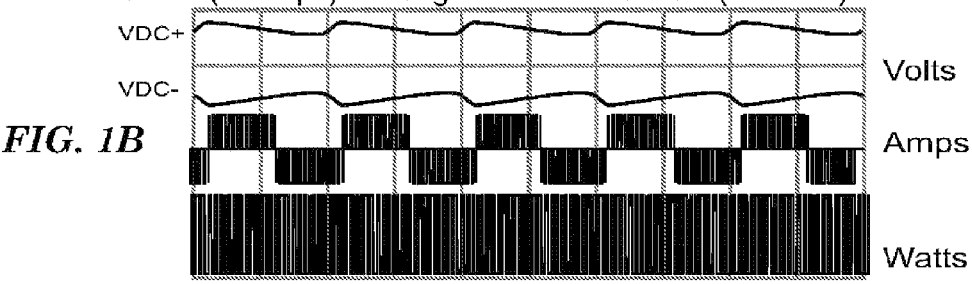

PWM Digital Power Amplifier: Digital Switched Variable Voltage, Current and Power Output to and Drawn by motor / load.

*FIG. 1C*

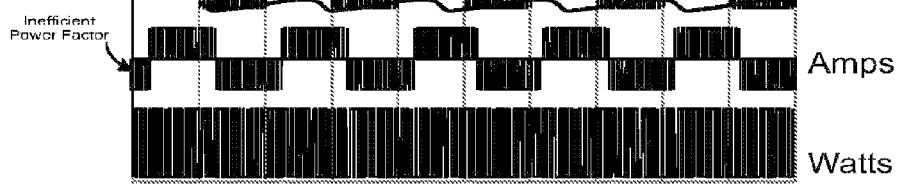

Motor / Load Power Signals: Digital Switched Variable Voltage Input, Pseudo sine wave Current and Power drawn by / in motor / load.

*FIG. 1D*

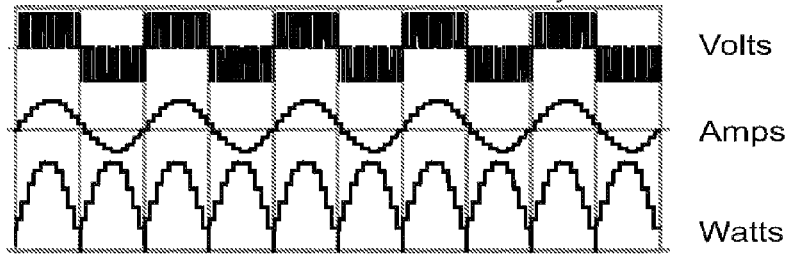

Traditional Analog Amplifiers Class A, B, AB on Inductive Load

AC Line: Analog Fixed Volts Input, Constant Variable Analog Current (or Amps) and Constant Variable Power (or Watts) draw.

*FIG. 2A*

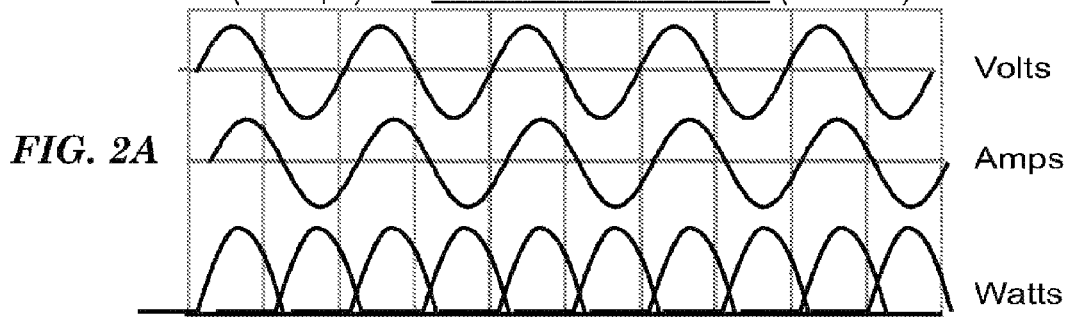

DC Power Supply Fixed DC Volts Input, Constant Variable Current (or Amps) and Constant Variable Power (or Watts) drawn.

*FIG. 2B*

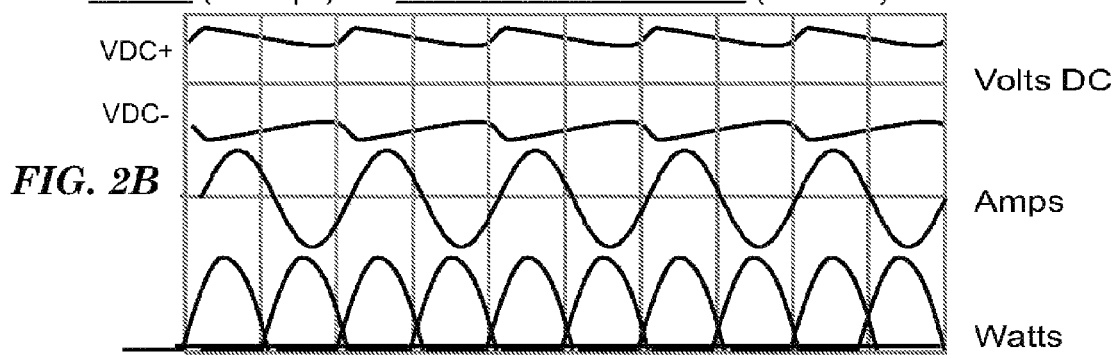

Analog Power Amplifier & Motor / Load: Constant Analog; Variable Voltage, Current and Power Output to and Drawn by motor / load.

*FIG. 2C*

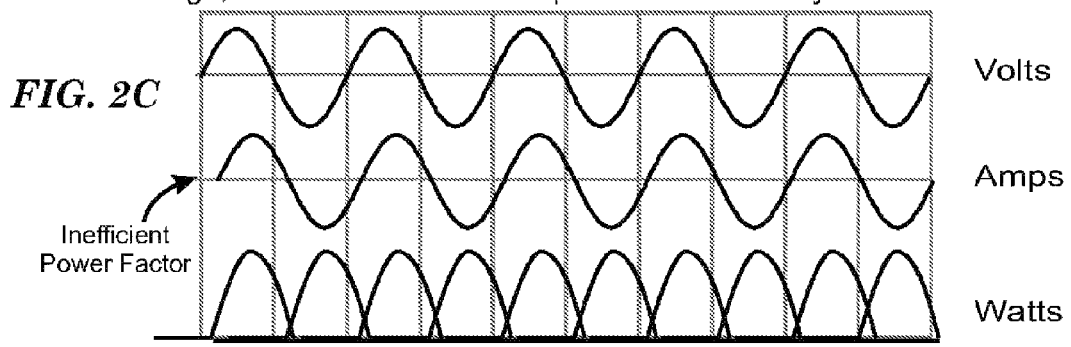

FIG. 3A

1] Input "data" [= cyclic motion +signals]

Conventional Method: Sensors and electronics convert analog motion into digital data signals (electric pulses) that are interfaced to a μP or DSP and then moved to the CPU via a digital CPU clock...

OPP method: The OPP converts analog motion into analog electromagnetic data (radiant or wave energy) that is directly Inputted, clocked or moved into the OPP via direct connection to shaft motion (= both clock & motion data).

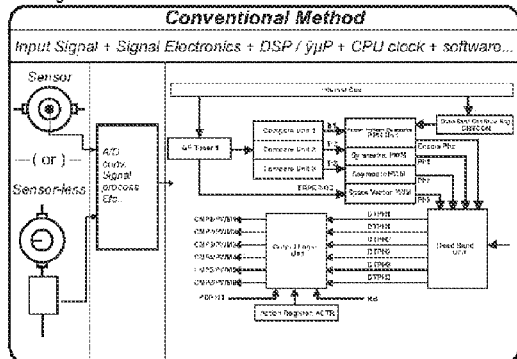
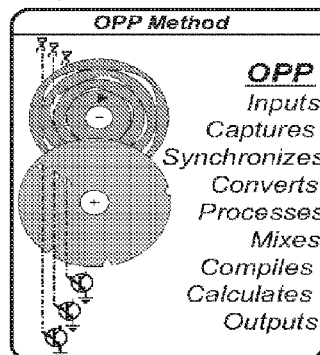

2] Process "data" [="clock & execute" pgms]

[Digital SW Program(s)]
Conventional Method: Digital SW pgms execute the inputted digital electric signal data per CPU clock cycle and then convert the computed results into a new set of digital output electric pulses moved by the CPU's clock...

[OPP Graphical Program(s)]
OPP Method: Graphical Pgms interact directly with the wave radiant energy by modulating or mixing the analog shaft motion with the Graphically prgmd instructions (wave windows) creating dynamic real time electromagnetic signals that are clocked, executed and co-processed by the shaft's movement!

3] Output Result(s) [=Electric Power Signals]

[Digital Output Waveform(s)]
Conventional Method: The CPU output clocked digital data must be interfaced to digital control circuitry and converted to new digital PWM data (electric pulses) to be clocked via a secondary digital clock to interface to the digital power driver; which sends hi-power digital electrical (switching) signals to the analog motor for conversion into analog motion.

[Analog Output Waveform(s)]
OPP Method: OPP converts the modulating real time electromagnetic data directly into real time electric signals (digital or analog) which can be directly amplified w/o added conversion to hi-power for direct use by the analog motor which converts the analog electric power to analog motion!

*The resulting voltage waveform to the Motor*

*Current in the Motor as a result of the voltage waveform*

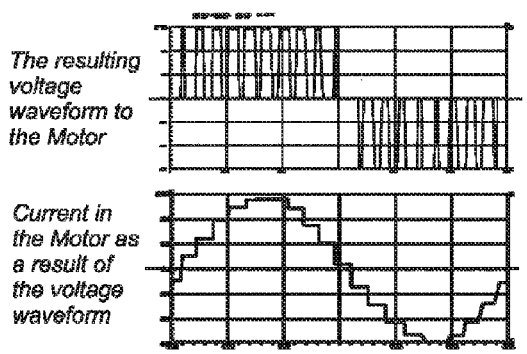

*OPP resultant voltage waveform to the Motor*

*OPP resultant Current waveform to the Motor*

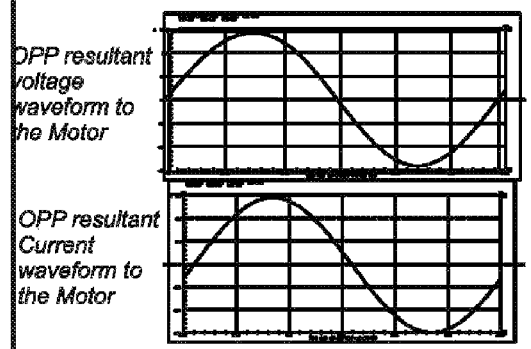

FIG. 5A
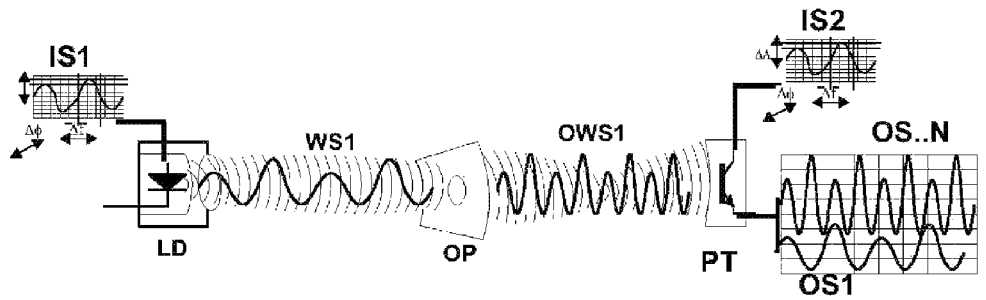
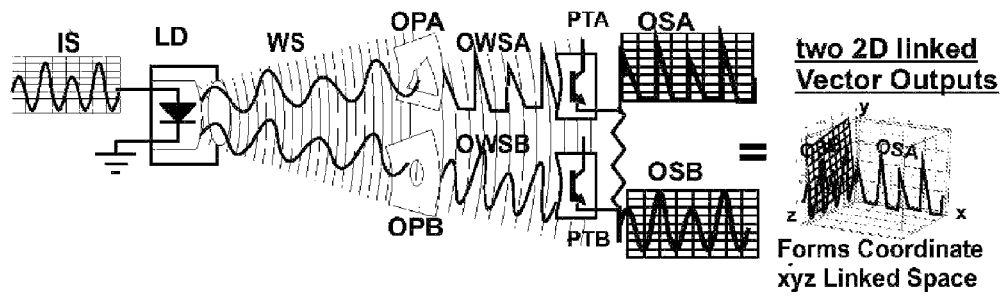
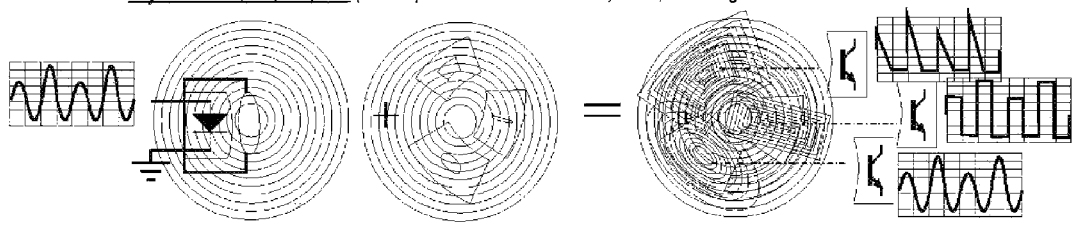
FIG. 5B
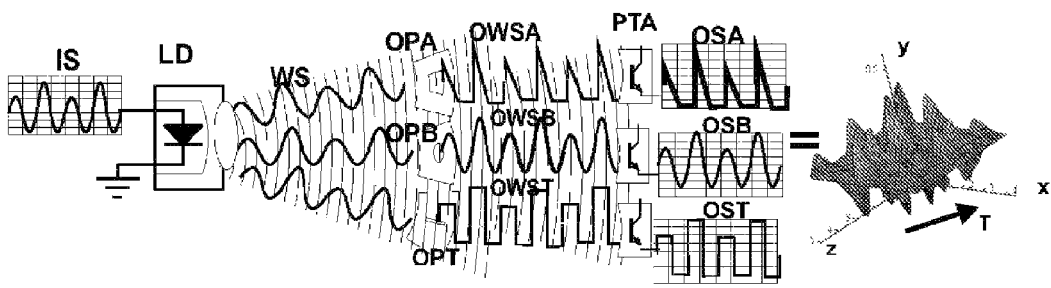

**Multi Parallel Vector Signal Input, Compute, Execute and Output:
Can input 2D vectors or 3D functions and output 2D or 3D Content**

*FIG. 5C*

'Map" 3D function / surface into two equivalent 2D tracks/ vectors/ functions

Map two 2D vectors into equivalent 2D OPPs which transforms (OPs) into 2 new vectors which nets, maps to new 3D function

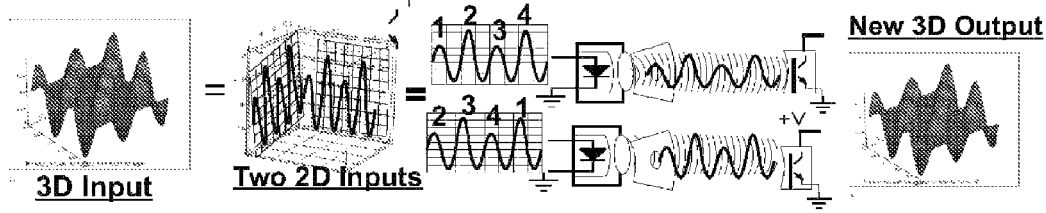

Multi Vector Signal Input, Compute, Execute and Output as 2D or 3D Vector Content

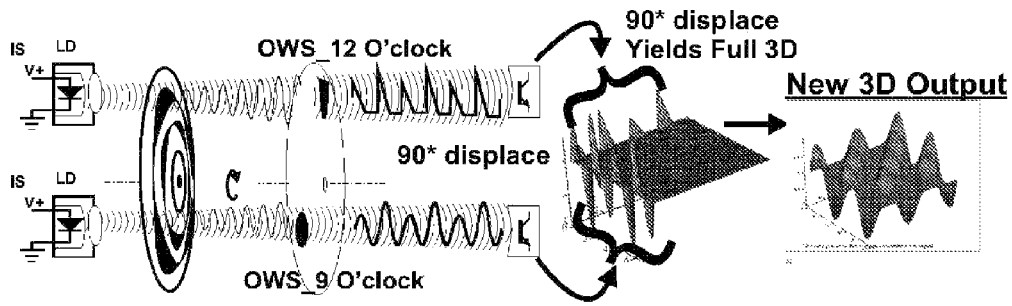

*FIG. 5D*

Below are two 3D plots of motor torque profiles; OPP can map and optimize these into multiple 2D load drive control signals (as Above).

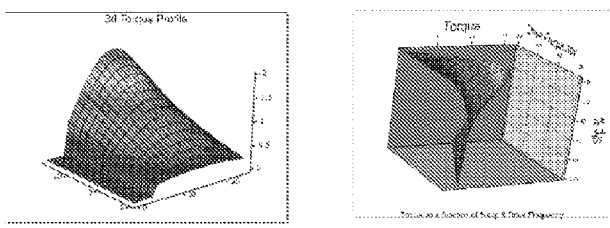

Below is a series of 2D Motor Torque Plots that also can be OPP mapped

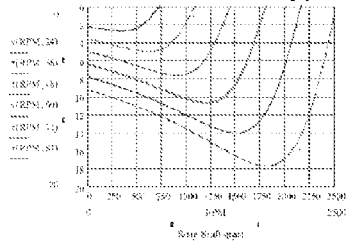

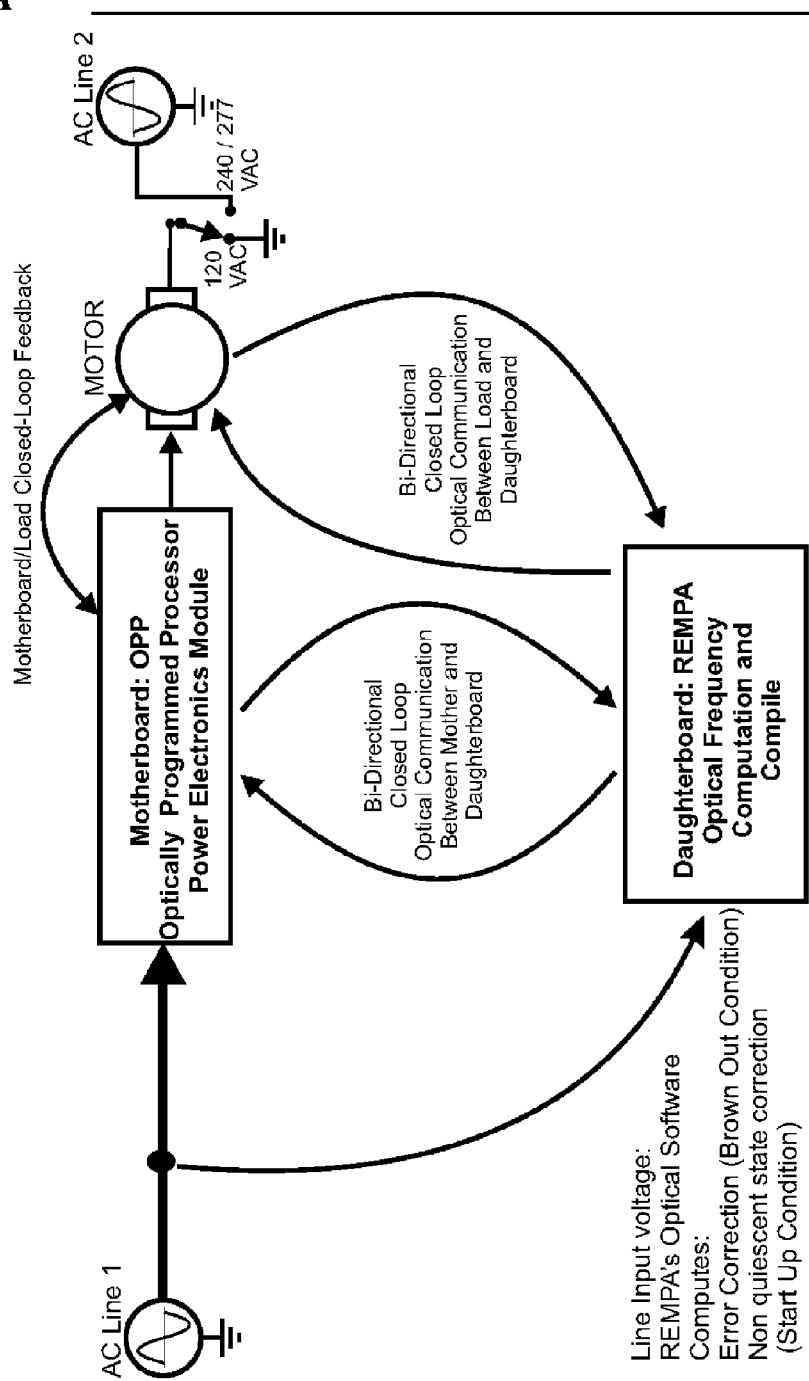
FIG. 6A — Simple Motherboard / Daughter board REMPA hardware example: (derivative of previous patents and patents pending)

FIG. 6B
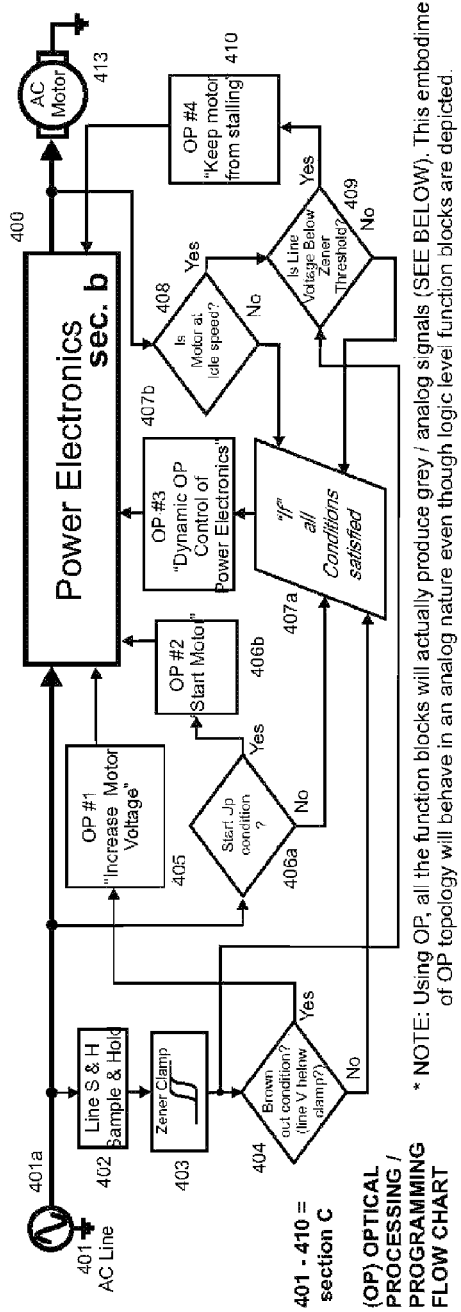
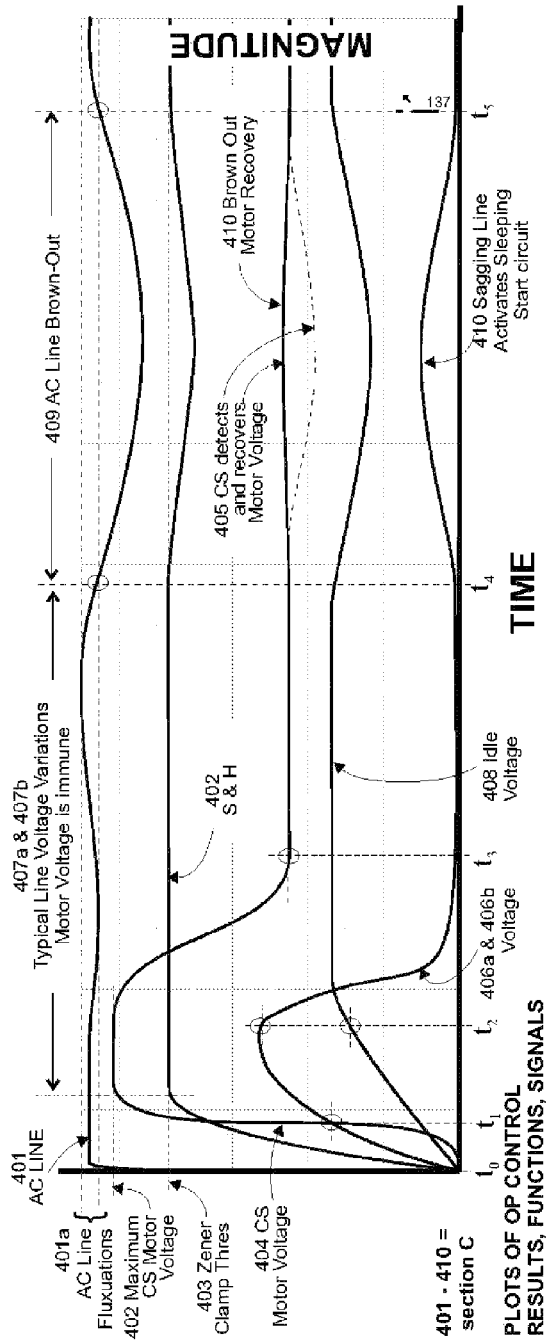

Excitation of resonant response
under GP control
2D Vector/Cartesian Resonant Representation
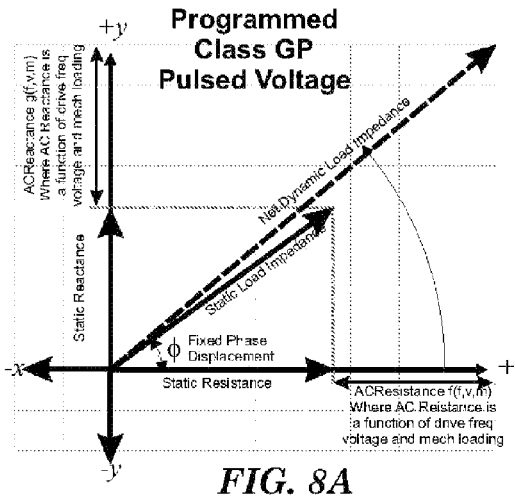
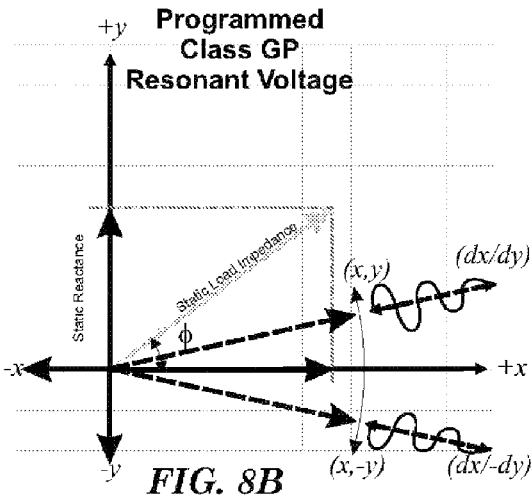
FIG. 8A  FIG. 8B
3D Vector/Cartesian Resonant Representation
Visual representation of 2 independent vectors, each with real and imaginary components, occupying orthogonal cartesian spaces. The space allocation described by each of the
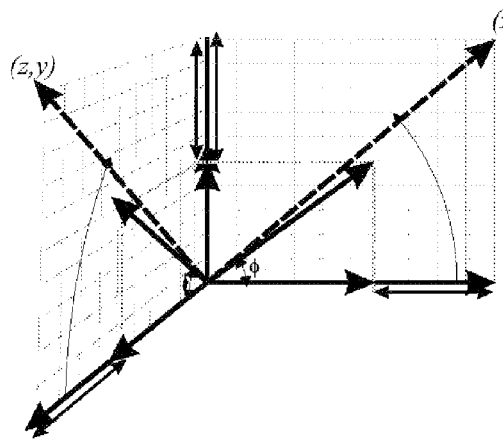
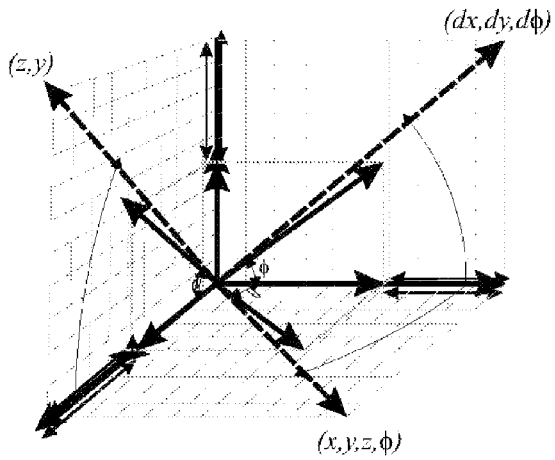
FIG. 8C  FIG. 8D

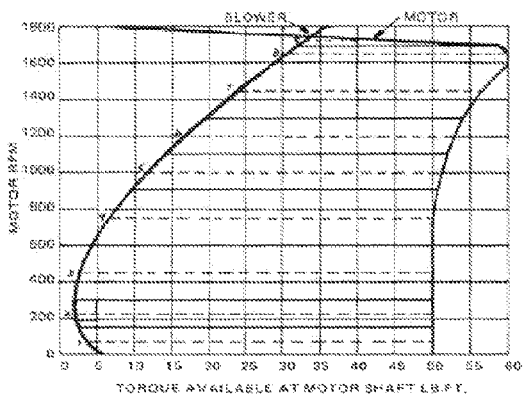
FIG. 9A
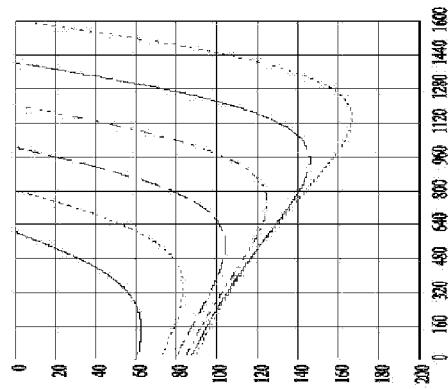
FIG. 9B
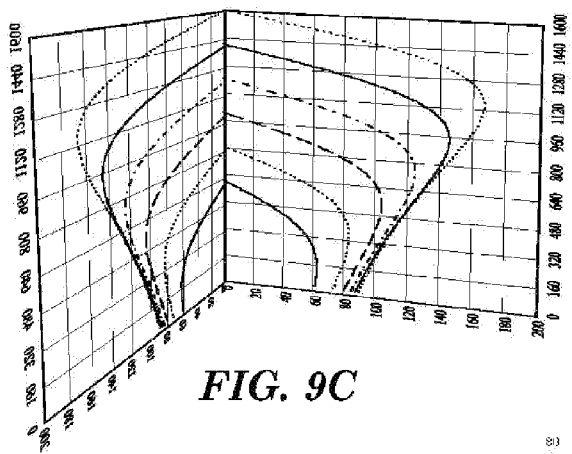
FIG. 9C
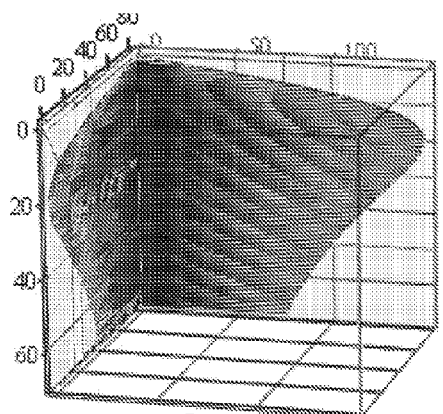
FIG. 9D
$$\tau_{s,\Gamma} := \frac{R_R \cdot \frac{f}{60}}{\left(\frac{s}{100}\right) \cdot 4 \cdot \pi \cdot \frac{f}{p}} \cdot \frac{\left(V_1 \cdot \frac{f}{60}\right)^2}{\frac{R_R^2}{\left(\frac{s}{100}\right)^2} + \left(\frac{f}{60} \cdot X_E\right)^2}$$
FIG. 9E
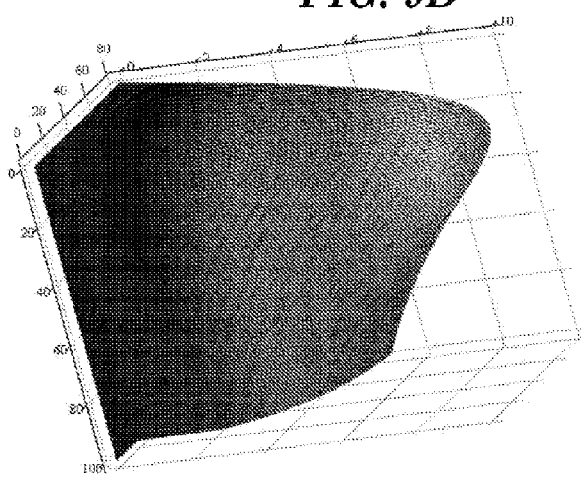
FIG. 9F

FIG. 10A Excitation of resonant response under GP control
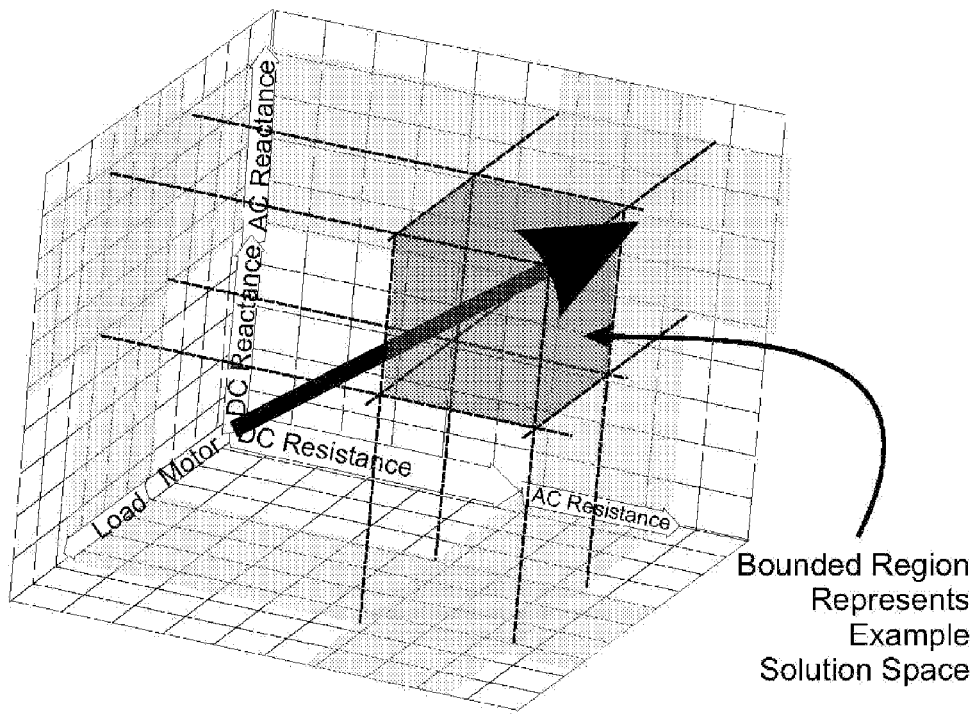
Bounded Region Represents Example Solution Space
FIG. 10B see FIG. 5D
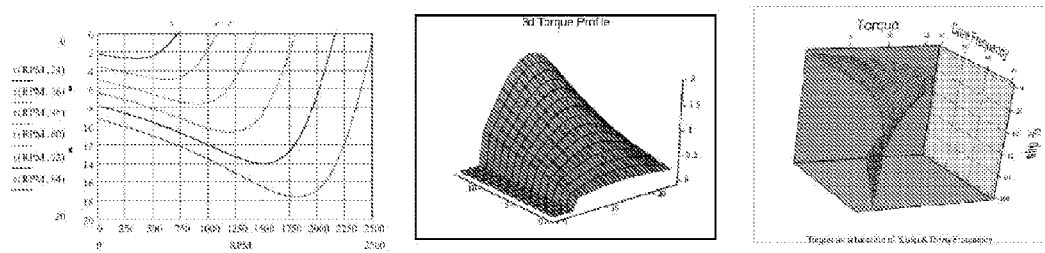
Motor Examples of Opto Programming in 3D or 2D for Complete "Electric Motor" - True Motion Programming !

REMPA: Resonant Electro-Mechanial Analog Power Amplifier Using OPP Timed Pulsed +/- AC Voltage Signal on Inductive Load

AC Line: Analog Fixed Volts Input, Pulsed Variable Analog AC Current (or Amps) and Pulsed Variable AC Power (or Watts) draw.

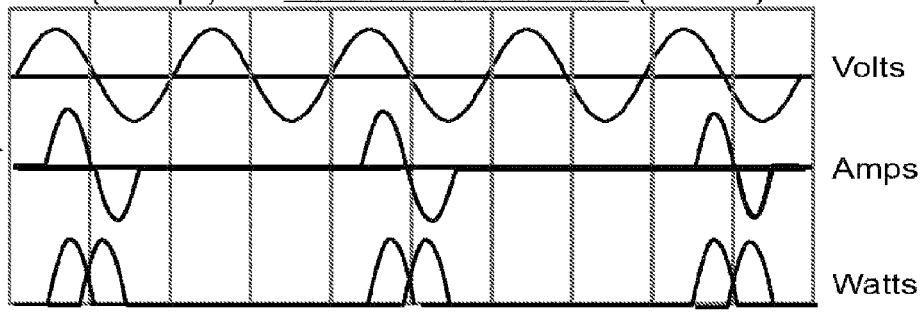

FIG. 11A

REMPA Output: Timed, Shaped Resonant AC Voltage, Current, Watts and Input to Load.

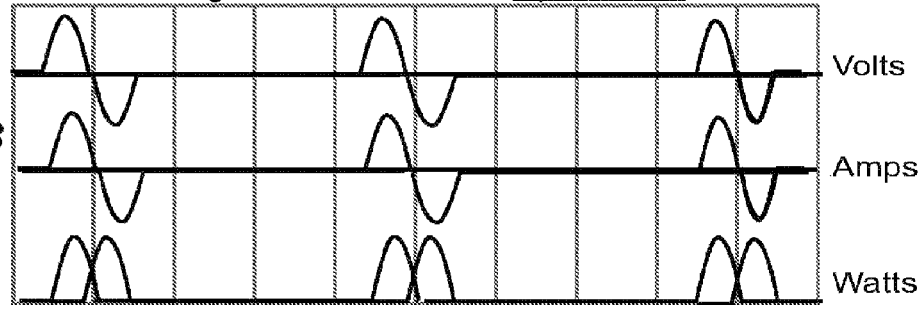

FIG. 11B

Load Resonant Analog Operating Power

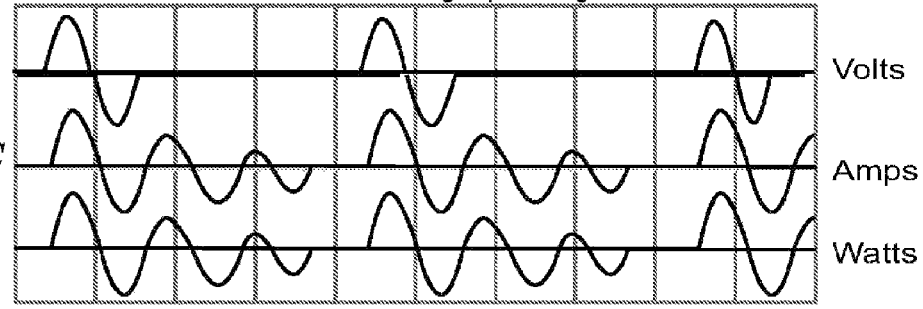

FIG. 11C

Load Actual Operating Power shows Resonance with added current and power but not from or to AC Line.

**REMPA: Resonant Electro-Mechanial Analog Power Amplifier
Using OPP Timed Pulsed +DC Voltage Signal on Inductive Load**

AC Line: Analog Fixed Volts Input, Pulsed Variable Analog +DC Current (or Amps) and Pulsed Variable +DC Power (or Watts) draw FIG. 12A
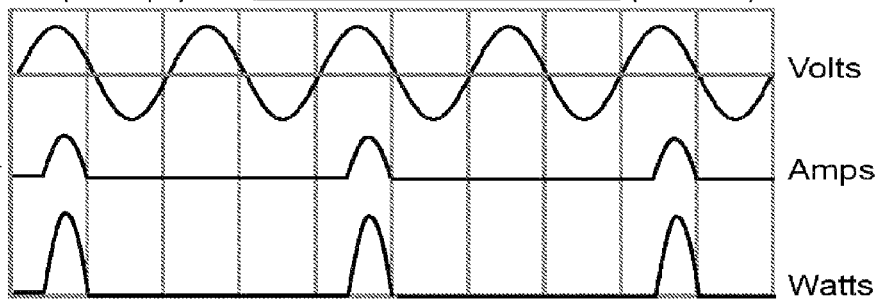

REMPA Output: Timed, Shaped Resonant +DC Voltage, Current, Watts and Input to Load.

FIG. 12B
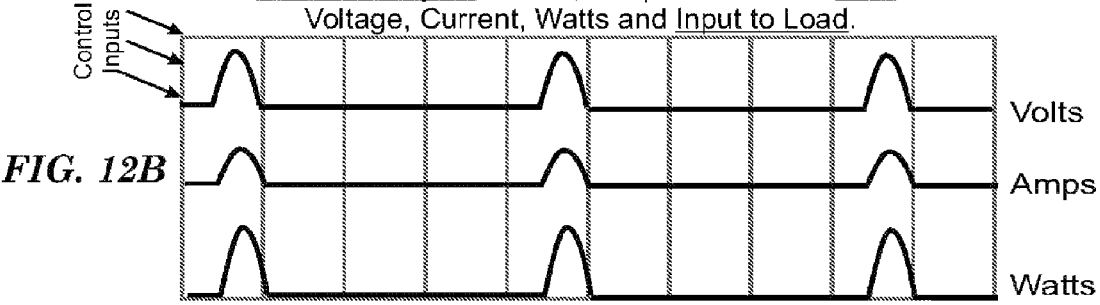

Load Resonant Analog Operating Power

FIG. 12C
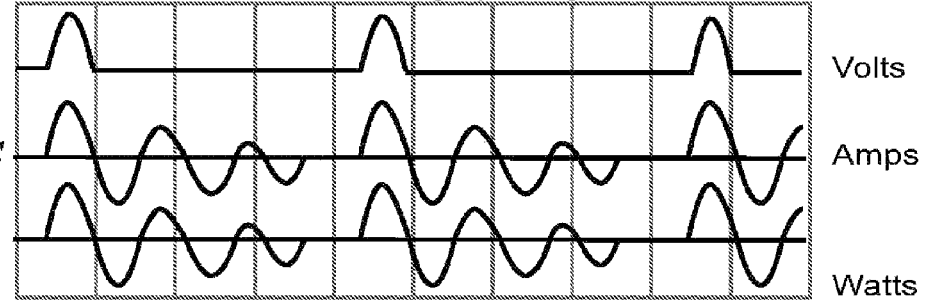

Load Actual Operating Power shows Resonance with added current and power but not from or to AC Line

REMPA: Resonant Electro-Mechanial Analog Power Amplifier Using OPP Timed Pulsed -DC Voltage Signal on Inductive Load

AC Line: Analog Fixed Volts Input, Pulsed Variable Analog +DC Current (or Amps) and Pulsed Variable -DC Power (or Watts) draw.

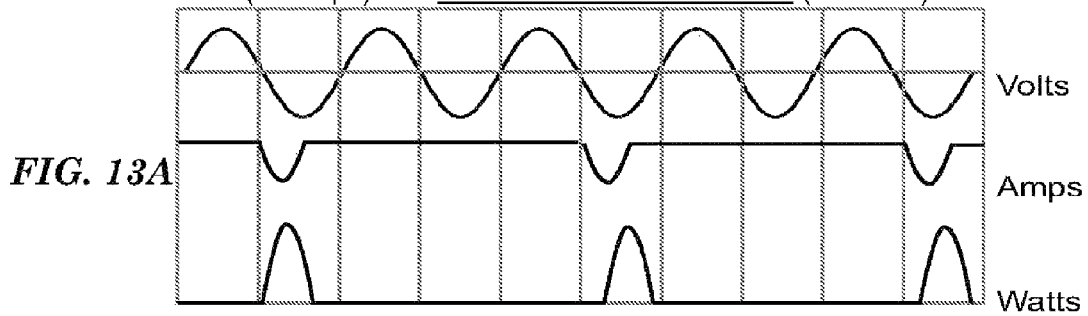

FIG. 13A

REMPA Output: Timed, Shaped Resonant -DC Voltage, Current, Watts and Input to Load.

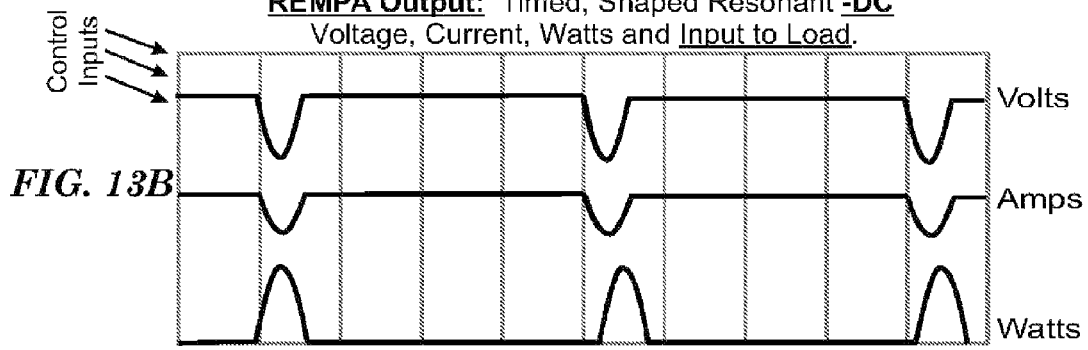

FIG. 13B

Load Resonant Analog Operating Power

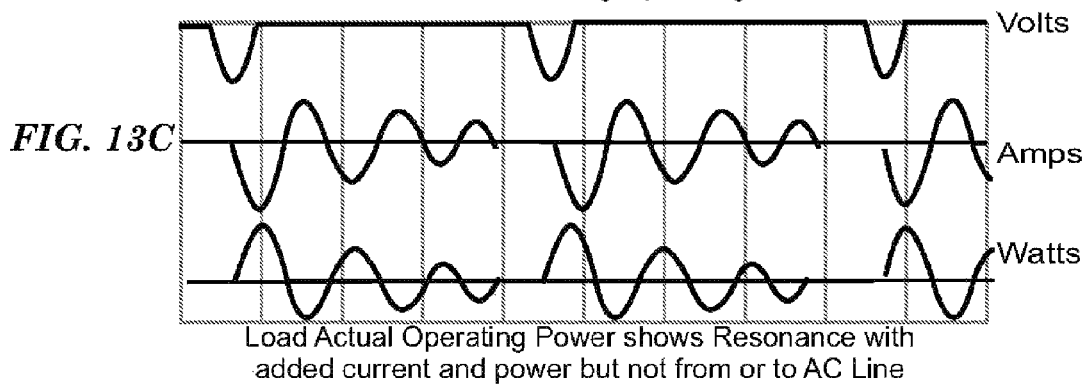

FIG. 13C

Load Actual Operating Power shows Resonance with added current and power but not from or to AC Line

More REMPA Pulsed DC Output examples

What AC Line "Sees" from Lower Resonant REMPA Rate Outputs.

What Load "Sees" from Lower Resonant REMPA Rate Outputs.

What Load "Does" with Lower Resonant REMPA Rate Outputs.

Other REMPA types of single sided Outputs.

Multiple REMPAs Sharing Single AC Line
Multiple AC Loads Sharing Single REMPA
FIG. 15A  OPP VECTOR Controller "N" Multiple Concurrent Resonant Rates & Outputs
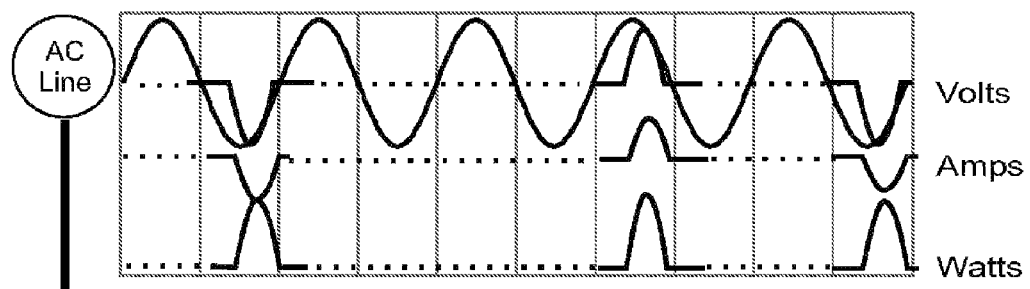
FIG. 15B
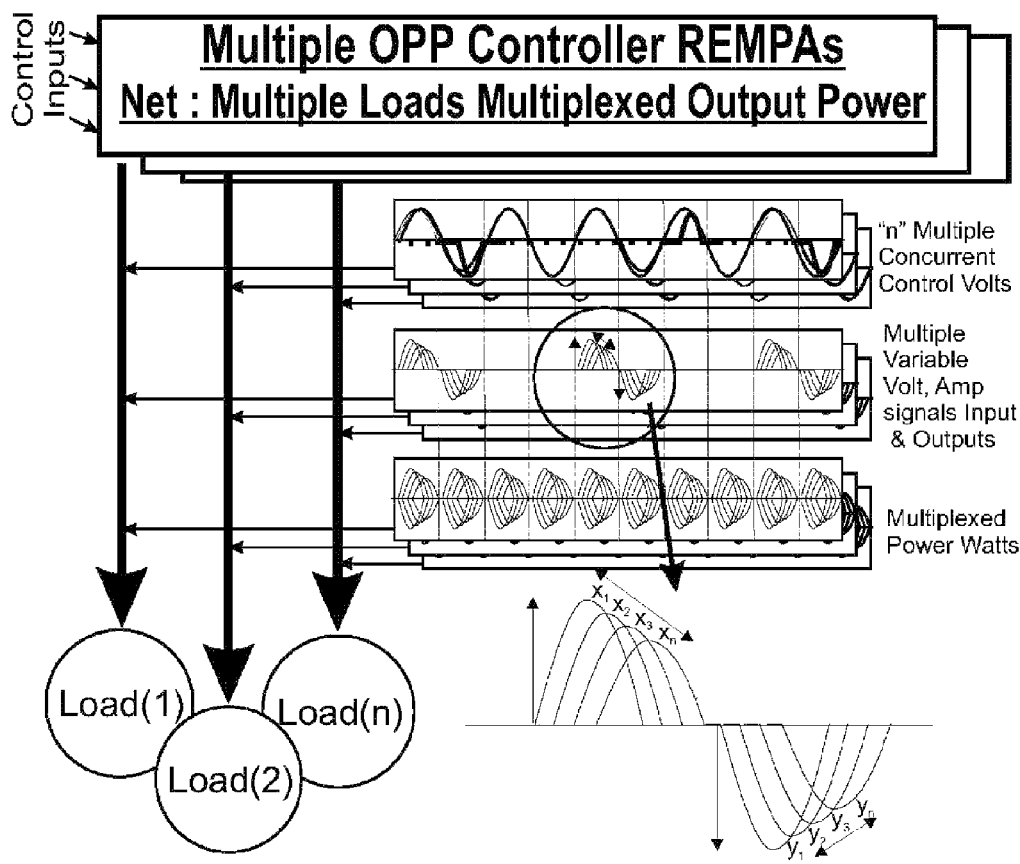

More REMPA Examples Using <u>OPP Timed Pulsed VECTOR Shaped Voltage Signals</u>

REMPA Output: Resonant <u>Single Pulsed</u> DC & AC <u>Vector Voltage Shapes</u>.

Volts

Amps

Watts

REMPA Output: Resonant <u>Multiple Pulsed</u> <u>Vector Voltage Shapes</u>.

Volts

Amps

Watts

CONTROLLED RESONANCE IN ELECTRICAL POWER DEVICES

TECHNICAL FIELD

This invention relates to the field of control systems for the conversion of energy between electrical and other energy forms for the purpose of doing work and, more specifically to control systems for electrical power devices, such as electric motors.

BACKGROUND ART

Variable speed commutation and control of AC (Alternating Current) electric motors has had high interest and visibility for a number of years. It is well known that in most instances machines, systems and devices powered by electric motors with a fixed operating speed become more efficient, capable and effective when given an ability to vary the motor's operating speed. There are a number of techniques, methods and apparatus to achieve changing motor speed and the speed of the machines they power. Many of these systems use digital control methods to effect the proper power, commutation and speed. An example of a digital control method illustrated in FIGS. 1A-D illustrates a technique called Pulse Width Modulation or PWM. This common digital approach uses variable width digital pulse switching of a high frequency carrier wave to create a pseudo average voltage or current power level by summing (integrating) the on and off times of a given signal.

Normally any given analog electric motor converts incoming analog electric power into analog mechanical output power. But as can be seen in FIGS. 1A-D for a typical digital or PWM approach this is not the case. As illustrated in the series of FIGS. 1A, 1B, 1C, 1D; the incoming fixed analog AC power signal is converted into a fixed DC (Direct Current) power supply signal (FIG. 1B) which in turn is converted into a switching digital power signal (FIG. 1C) which is sent to an analog electric motor FIG. 1D. The goal of a PWM or digital controller is to provide variable or adjustable electric power to an electric motor to vary or adjust its mechanical power out. But to become a signal that can power an analog electric motor the electric signal input to the motor must become an analog power signal before it can power a motor.

FIG. 1C illustrates a typical PWM output signal typically sent to drive a motor. As can be seen the commutation signals barely resemble a sine wave, analog signal or any other analog motor power commutation signal. To create or change this PWM power into a motor useable power signal (FIG. 1D) either the motor itself or some type of very intense pre-motor filter must absorb, integrate, sum and smooth the PWM switched power signal before the motor can use it. In essence the digital power signal (FIG. 1C) must be converted into an analog power signal (FIG. 1D) so the motor can in turn convert the electrical power into mechanical power.

In most cases of other PWM or digitally electrically powered systems and devices there is a similar series of power conversion steps that must occur before the analog work output can occur. From light bulbs to huge electric furnaces if they are varied by digital or PWM means the electric power must go through some similar series of power conversion to be converted into useable analog light, heat, rotation, motion etc.

This digital to analog mismatch and rematch adds cost, complexity, losses and many others. Programmable analog control of power conversions provides an alternative path and/or complementary technology for digital control solutions.

The implementation cost and complexity are clearly hindrances to using most digital methods, as illustrated in FIGS. 1A-D. However, harmonic noise and interference power signals of the digital carrier signal is another undesirable circumstance that is seen by the motor (FIG. 1D), the power driver (FIG. 1C) and the power supply (FIG. 1B) and the AC grid (FIG. 1A). These interference signals of the digital carrier signal are definitely not desired, useable or favorable for any of the four systems affected by them. In point of fact these harmonic interference signals as well as other high speed digital switching power problems can often cause more system problems to the machines they power than the value of the improvements being sought in varying or controlling analog power using digital power.

Some of these very serious digital power switching issues can be overcome by implementing some type of power filters or signal smoothers in the power control circuit but these not only add more cost and components they also have energy loss issues, heating and performance limits. Others have tried to solve some of these very serious digital power switching issues by implementing forms of analog control and analog power solutions, as illustrated in FIGS. 2A-C [Need detailed Description of the FIGS. 2A-C including a discussion of the inefficient power factor]. Besides much higher expense, these traditional analog power amplification methods and apparatus that allow some measure of repeatable system control are usually very inefficient, costly and cumbersome.

However, PWM harmonics, overshoot, and resonance may not be the issues that they presently appear in practice. These aspects of digital control may simply be out of sync with the needs of the analog power devices they are driving. More specifically, if these signal characteristics are appropriately modeled and controlled by a complementary control technology then they may be used constructively rather than destructively in overall system design.

Optical & Graphical Programmed Analog Controllers

An alternative to these above traditional controller techniques have been disclosed and described in prior art patents U.S. Pat. Nos. 5,665,965; 6,087,654 and 7,797,080. These disclose methods and apparatus for commutating, controlling and powering electric motors and machines using Optical and Graphical Programming and Processing (OP/GP) techniques. FIGS. 3-5 illustrate some examples of the apparatus, methods and systems for this prior art and patent references in providing a simple but powerful closed loop control scheme for electric motors, machines and devices. A brief preview is illustrated of this prior art in FIGS. 3-5. These Figures illustrate, describe and note low power inputs of signals, sensors, vectors, parameters and variables to high power signals, programs, vector and commutation output are achieved using new analog techniques that use optoelectronics in new and innovative ways.

Specifically, a newer type of parallel analog processing and programming has been previously disclosed in the aforementioned patents is an alternative and complementary technology to serial digital processing and programming methods. FIG. 3A gives a general overview and basic side by side comparison of a traditional digital approach to computation, programming and power output versus an OP/GP approach to these same objectives. FIG. 3A lists a series of step by step I/O (input/output) of data capture and input; data program & process; program execution and output; and signal type, nature and use. FIG. 3B goes into some added detail for the programming aspects of the two approaches and gives an example of system programming using digital application software "C" programming versus Analog "Graphical Programming". It is this technology and distinct method and application differences that make possible the present disclosure and serve as the basis and foundation for the present disclosure.

FIG. 4 shows additional details on the operation of opto-processors and opto-programming. The elements of an opto-processor include: 1) a first electro-converter to move from the electrical domain into a wave domain in which the signal content (including data and vector information) can be manipulated by an analog transformation, 2) a means making the analog transformation(s) that embodies the opto-program, and 3) a second electro-converter to receive the transformed wave signal and convert it back to the electrical domain. In FIG. 4A, the opto-processor is implemented with a series of electro-optical elements, LD, an light emitting diode to convert into the optical wave domain, a vector graphic wave aperture, OP, to perform that programmed transformation, and a photo transistor PT to convert the transformed optical wave back to an electrical signal. Input signal IS gets (EC) converted by LD into WS; which gets transformed or Opto Programmed by OP; which converts and outputs OWS1; which becomes the input to OP2; which further transforms, alters and combines e.g. co-programs OWS1; and then OP2 outputs OWS2; which becomes the input to PT; which now (EC) converts and outputs the resultant of OWS2 as a composite, controlled, variable programmed electric signal. An electrical signal (IS) is received, converted into a wave signal (WS), passes through one optical program feature (OP1) to be transformed into a first opto-programmed wave signal (OWS1), passes through a second optical program feature (OP2) to be further transformed into a second opto-programmed wave signal (OWS2), and is then converted into an output electrical signal (OS) with the desired programmed output signal parameters. Note that the output electrical signal may retain original input signal data, vector, or power characteristics in addition to the desired opto-programmed parameters. It is a very basic example of an OPP: where OP1 rotates moves graphic apertures (vector windows) that convolve (integrate) WS into an output wave OWS1 that then mixes, transforms with a non-rotating co-designed OP2 graphic vector aperture, to create and output OWS2; which contains new signal data in a wave domain that gets converted (EC) via PT into new signal data in an electric domain. Rotating, moving an OP in a wave field WS is a primary changing variable that directly creates, programs, controls, changes or alters the output electric signal OS. Changing the amplitude or bias of LD or PT also changes (controls) the output signal. FIG. 4B is a much more sophisticated embodiment of two OPP paths with both rotating and non-rotating Ops. This illustrates how complex integrated array signal processing and data storage is achievable using basic OPP technology. It shows multiple, concurrent, parallel input signals (IS) & programs (OP) can provide: parallel, signal, vector, matrix, and data processing & programming, with active and passive memory storage and buffering (OP), resulting in controlled variable interconnected or multi-dimensional outputs (OS). Not the same multi-dimensional opto-program is being applied simultaneously to independent input/output signal paths. Increasingly complex combinations of multiple inputs, outputs, and opto-program features enable a wide variety of applications in signal processing and resulting control algorithms.

DISCLOSURE OF INVENTION

The present disclosure relates to systems for controlled resonance in electrical power devices. A programmed signal processor generates output control signals from input electrical signals based on resonant control parameters for a target power device. Analog electrical control systems for controlled resonance, power devices incorporating controlled resonance, and opto-programmed controllers for use in controlled resonance applications are described. The present disclosure utilizes a resonant, timed pulsed electric conversion to another form of an energy, including, but not limited to, mechanical, magnetic, thermal, audio, light, etc. or any other energy that is physical in nature. The present disclosure primarily addresses the power amplifier, power converter and power output aspects of these processes and, more specifically, controlling resonance for a target power device for improved control, operation, and efficiency. One goal of the present disclosure is to apply opto-processing and graphical programming techniques for electric motor control, commutation and powering that adds additional improvements, innovation and implementation.

One aspect of the invention is an analog electrical control system. A programmed signal processor generates an output control signal from at least one input electrical signal. The output control signal is generated from the input electrical signal by the programmed signal processor to include a plurality of resonant control parameters for a target power device receiving the output control signal. The programmed signal processor may inject periodic voltage pulses into the output control signal inducing a collapsing field in the target power device for each of the resonant control parameters to achieve and maintain resonance of the output control signal and operation of the target power device. The programmed signal processor may be an opto-processor executing an opto-program including multi-dimensional profiles and a graphic pulsed resonance feature to generate the resonant control parameters for the target power device. The multi-dimensional parameter profiles may include at least 3 dimensions, multiple concurrent inputs, multi-dimensional outputs. The programmed signal processor may be an opto-programmed controller providing power to the target power device. The opto-program may include graphical control of at least one characteristic selected from the following: amplitude, frequency, timing, phase, vectors, shapes, and events. The graphic pulsed resonance feature of the opto-program may generate periodic voltage pulses in the output control signal with resonant frequency and amplitude for at least one of the resonant control parameters. The input electrical signal may be direct current and the opto-program may include graphical control of variable positive and negative excursions applied to the input electrical signal using amplitude and frequency modulation. The programmed signal processor may also include a sensor signal input for receiving a controllable device condition and integrating the signal input into closed-loop control of the target power device using an operating range for the condition with a minimum value and a maximum value and automatically varying the output control signal based on the sensor signal input to maintain resonance. The resonant control parameters may include resonant characteristics of the target power device and a load on the target power device. The resonant control parameters may include demand characteristics of the input electric signal. The output control signal may control multiple target power devices to achieve and maintain resonance using a common input electrical signal and wherein each of the target power devices have different resonant control parameters. The programmed signal processor may include at least one programmable duty cycle amplification feature that uses less than 50% power of the input electrical signal to generate the output control signal to drive a greater than 50% duty cycle of the target power device. The programmable duty cycle amplification feature may include options for integer, non-integer, fractional, partial, and greater than input frequency division of an input frequency of the input electrical signal. The target power device may be an electric motor, an induction heater, a resistance heater, a light source, a wave generator, a field generator, an electric generator, a transformer, an inductor, a capacitor, or an energy storage device. The programmed signal processor may use the resonant control parameters to control the electric motor for at least one of the following outcomes: torque control, speed control, power control, energy efficiency, load characteristics, and event response. The programmed signal processor may be programmed using a mathematical model of the electric motor including the following parameters in a defined relationship: number of poles, motor input signal, rotor slip factor, peak phase voltage, root mean square voltage, rotor resistance, stator resistance, rotor reactance, stator reactance, total resistance, and total reactance.

A second aspect of the invention is an electrically connected power device, comprising an electrical input, a device load, a power electro-converter driving the device load, and a programmed signal processor for controlling the device load using the electrical input and the power electro-converter. The programmed signal processor injects periodic voltage pulses into the power electro-converter to induce a collapsing field for each of a plurality of resonant control parameters to achieve and maintain resonance of the power electro-converter. The programmed signal processor may be an opto-processor executing an opto-program including a plurality of multi-dimensional parameter profiles and at least one graphic pulsed resonance feature within the multi-dimensional parameter profiles to generate the resonant control parameters.

A third aspect of the invention is an opto-programmed controller, comprising, an electrical signal input, a control signal output, an opto-processor, and an opto-program for generating an output control signal from at least one input electrical signal, wherein a plurality of multi-dimensional parameter profiles and at least one graphic pulsed resonance feature within the multi-dimensional parameter profiles generates a plurality of resonant control parameters for a target power device receiving the output control signal. The opto-processor may inject periodic voltage pulses into the output control signal inducing a collapsing field in the target power device for each of the resonant control parameters to achieve and maintain resonance of the output control signal and operation of the target power device.

A fourth aspect of the present disclosure is an electro-converter device control and management system, comprising: at least two controllable electro-converter devices; an opto-programmed controller that generates an output control signal for the control of each of the at least two controllable electro-converter devices, each opto-programmed controller comprising at least one optical device and at least one sensor for sensing each controllable electro-converter device condition and providing at least one input signal representing the condition to the opto-programmed controller, wherein the opto-programmed controller receives the at least one input-signal from the at least one sensor concurrently and integrates the at least one input-signal into at least one control signal, and generates at least one output signal to drive each controllable electro-converter device such that at least two controllable electro-converter devices can concurrently co-exist and be successfully operated by each single electro-converter device control and management system.

A fifth aspect of the present disclosure is at least two electro-converter device control and management systems, comprising: a single AC electrical connection to a power grid, each of the at least two electro-converter device control and management systems being operatively connected to the power grid through the single AC electrical connection; at least one controllable electro-converter device operatively connected to each of the at least two electro-converter device control and management systems; an opto-programmed controller that generates an output control signal for the control of the controllable electro-converter device, the opto-programmed controller comprising at least one optical device; and at least one sensor for sensing at least one controllable electro-converter device condition and providing at least one input signal representing the condition to the opto-programmed controller, wherein the opto-programmed controller receives the at least one input-signal from the at least one sensor concurrently and integrates the at least one input-signal into at least one control signal, and generates at least one output signal to drive the controllable electro-converter device such that the at least two controllable electro-converter device control and management systems can have each of the at least one control signals commingled, multiplexed and or heterodyned on the single AC electric connection to the power grid at the same time to concurrently drive each controllable electro-converter device with the AC line frequency acting as a carrier frequency.

A sixth aspect of the present disclosure is a closed loop, dynamic, Opto Programmable (OP) Control and Management System comprising: a sensor that senses a condition and provides input signals relating to the condition; an electro-converter device; and an opto-programmed controller that receives input signals from the sensor and provides control signals based on the input signal received from the sensor to continuously vary a parameter of the electro-converter device, the opto-programmed controller comprising: control circuitry including an opto-programmed control section that stores a plurality of parameter profiles and is opto-programmed to continuously vary at least one parameter of a plurality of parameters of the electro-converter device according to target values of a parameter profile selected from the plurality of parameter profiles, the target values including a minimum value for the electro-converter device and other values higher than the minimum value, each target value being based on at least one sensed condition, wherein the opto-programmed control section is opto-programmed to continuously vary the sensed condition of the electro-converter device based on at least one input signal relating to the condition sensed by the sensor and the target values in the selected nonlinear parameter profile, a commutating of the electro-converter device being effectuated by periodic DC pulses computed, timed and performed sufficiently such that each DC pulse is sufficient to maintain the electro-converter device commutating, the computed, timed and performed periodic DC pulses inducing a collapsing field within the electro-converter device such that the collapsing field is routed through the electro-converter device windings, capacitor and rotor to achieve resonance or a commutation pattern.

A seventh aspect of the present disclosure is a method for commutating an AC electro-converter device to achieve resonance comprising: providing an AC electro-converter device; providing a sensor that senses a condition and provides input signals relating to the condition; providing an opto-programmed controller that receives input signals from the sensor and provides control signals based on an input signal received from the sensor to continuously vary a parameter of the electro-converter device, the opto-programmed controller comprising: control circuitry including an opto-programmed control section that can be programmed with a plurality of parameter profiles and is opto-programmed to continuously vary at least one of the nonlinear parameters of a plurality of possible parameters of the AC electro-converter device according to a selected one of the parameter profiles from the plurality of parameter profiles, the nonlinear parameter profiles including target values for the AC electro-converter device, the target values including a minimum value for the AC electro-converter device and other values higher than the minimum value, each target value being based on at least one sensed condition; opto-programming the control section to continuously vary the sensed condition of the AC electro-converter device based on at least one input signal relating to the condition sensed by the sensor and the target values in the selected nonlinear parameter profiles; and commutating the AC electro-converter device utilizing periodic pulses computed, timed and performed such that each pulse is sufficient to maintain the AC electro-converter device commutating, the computed, timed and performed periodic pulses inducing a collapsing field within the electro-converter device such that the collapsing field can be routed through the electro-converter device windings, capacitor and rotor to achieve a resonance commutation pattern.

BRIEF DESCRIPTION OF DRAWINGS

FIGS. 1A-1D are graphs showing the operation of prior art digital or switched pulse width modulation (PWM) amplifiers on an inductive load.

FIGS. 2A-2C are graphs showing the operation of prior art analog amplifiers class A, B, AB on an inductive load.

FIGS. 3A-3B are diagrams showing the comparative method of operation of prior art digital signal processing and computer programming compared to prior art opto-processing and graphic opto-programming.

FIGS. 5A-D are diagrams showing opto-processors and opto-programs of increasing dimensionality (2D, 3D, ND) to enable more multiple inputs, output, and multidimensional control parameters.

FIGS. 6A-B and 7A-B are diagrams of specific embodiments of the present disclosure incorporating prior art opto-processor components.

FIGS. 8A-8D, 9A-F, and 10A-B are graphical representations of programmed resonant control parameters in accordance with the present disclosure.

FIGS. 11A-C, 12A-C, 13A-C, 14A-D, and 15A-D are graphs showing the application of signal processing in accordance with the present disclosure to shape output control signals for resonant operation of target power devices.

BEST MODE OF CARRYING OUT THE INVENTION

FIGS. 6A-B and FIGS. 7A-B list specific apparatus and methods of embodiments of this power system that offer still greater energy savings and power utilization than previously achieved using electro-mechanical means with OP/GP means. This power converter and output also helps overcome many of the issues associated with traditional present art digital techniques in the amplifier, converter, output aspects as well as some of the input, program, process and other functions.

Figure 7A:
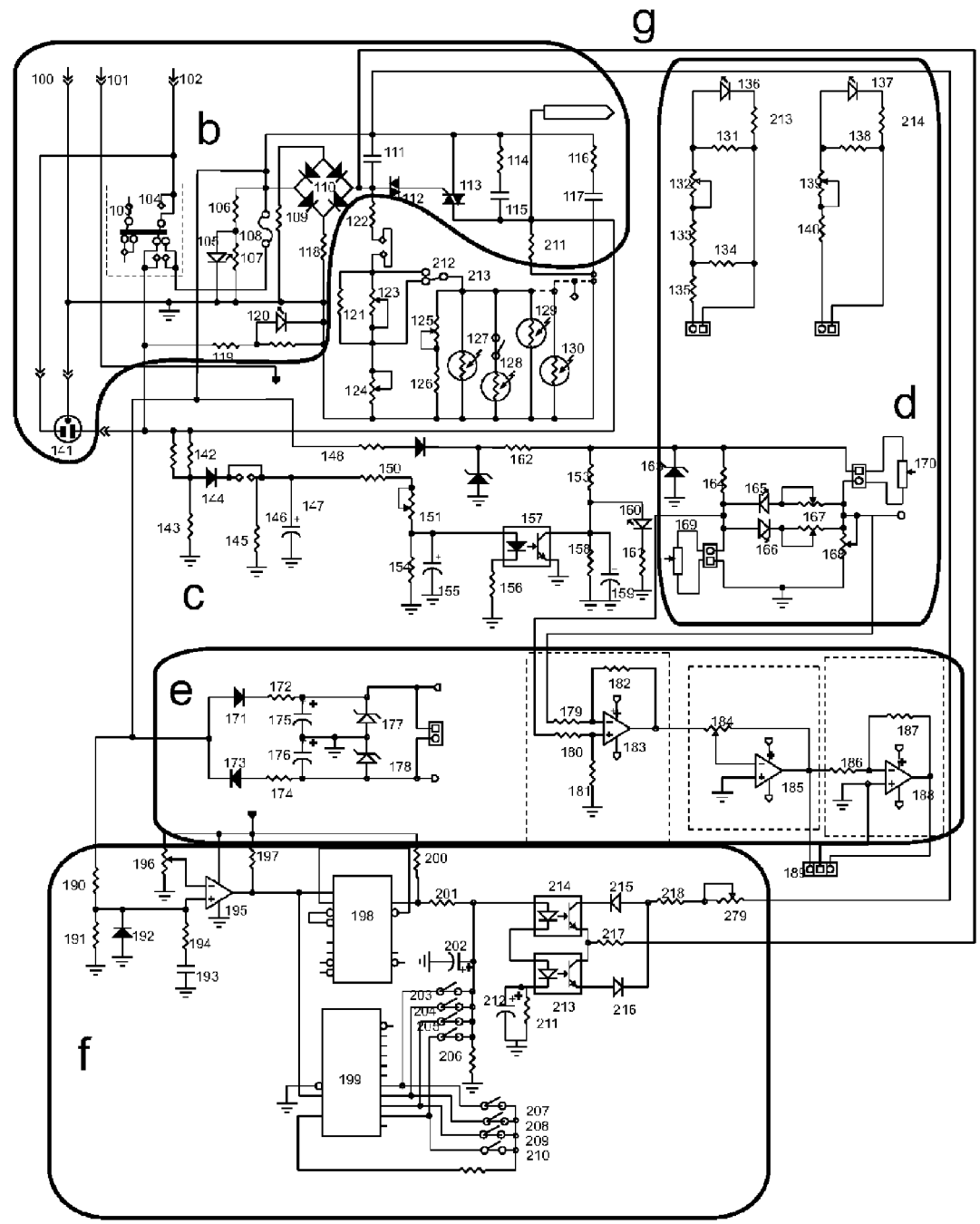
Figure 7B:
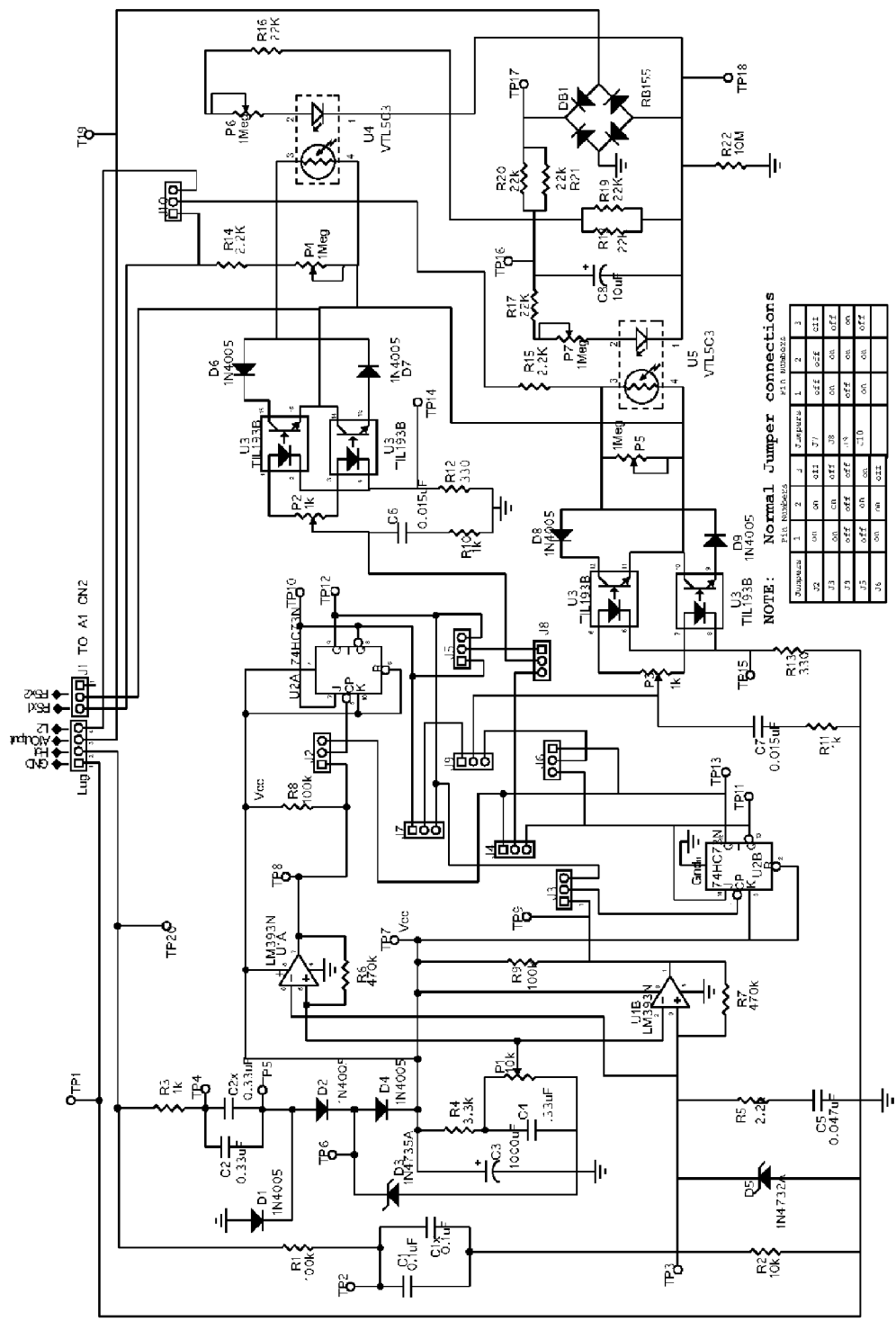

These new methods and systems utilize Electro-mechanical means to effect controlled resonant constructive power drive action for machines, systems and devices powered by electromagnetic flux. One particular benefit and feature that these new methods and systems affords is a new Electromechanical means to effect the controlled resonant constructive power drive action for new and existing compressors, pumps, fans or other rotating machines and systems powered by electric motors. FIG. 6A is a block diagram of implementation, FIG. 6B illustrates a Flow chart and system timing signals and plots. FIG. 7A illustrates a full circuit configuration of FIG. 6A and FIG. 7B illustrates a more detailed alternative circuit subsection example of a section of the FIG. 7A circuit.

One goal of the present disclosure is to disclose how these new methods, apparatus and techniques can be used for devices other than electric motors. FIGS. 7A, 7B circuit embodiments are not limited to only powering an electric motor. The disclosed apparatus in FIGS. 7A-B could apply to variable electric controlling and powering of virtually any other electric machines, systems, devices and the like that operate with induction, electromagnetic flux or field control. FIGS. 8A-10 illustrate more proofs and features of the present disclosure, as will be discussed below. These Figures further illustrate the generic and flexible capability that the concepts of the present invention can be applied to more than electric motors.

Additionally, the example embodiments provided herein use relatively simple 2D and 3D models and parameter sets for resonance control. FIGS. 5A-D show the increasing complexity that can be achieved through multi-dimensional parameters, as well as multiple inputs and outputs. FIG. 5A is an example of an OPP that uses fixed vector apertures (non-rotating or moving), but shows the same basic simple OPP steps and components. It also shows how very sophisticated vector signal processing and control can be done with OPP. This example and others that follow show that increasingly complex, concurrent, parallel, integrated, signals, data, programs, vectors can be achieved simply and reliably with OPP. Dynamic multiple IS input signals with 1 fixed optical program OP nets multiple "N" output options. Conversely, using single fixed 2D input signal a multi-channel optical processor can create and control multiple output signal vectors, both 2D and 3D, so one input becomes multi-dimensional outputs. FIG. 5B shows multi-dimensional outputs from one or more inputs sets, not only 3D but "N" dimensional (see also FIG. 10A). FIG. 5C shows multi-dimensional signal inputs can map into one to "N" outputs. FIG. 5D further shows that these above 3d concepts and multi-dimensional parameter feature controls directly apply to electric power devices that have real multiple parameters that concurrently interact on their function but can be mapped, controlled, commutated, and resonated.

The following definitions will be applied throughout this disclosure:

"Electro-converter (EC)" is any device that converts electric energy to or from wave energy. There are two major categories of electro-converters, signal electro-converters and power electro-converters.

"Signal electro-converters" are primarily focused on the signal, data, or program content in the electro-conversion and generally involve low power electricity to or from wave energy (light, radiant, flux, magnetic, etc.). These ECs usually are a signal level "single step–wave converters" that convert electric or wave signals, data or programs. Generally, they do not directly involve any work or power conversions. Usually there are no added conversion steps involving physical, mechanical, thermal or other higher power energy or force. Examples of signal electro-converters from electric to wave energy include: LED, wave emitter, inductor, coil, capacitor, hall effect, electro-magnet, etc. Examples of signal electro-converters from wave to electric include: Photo-Diode (PD), Photo-Tx (PT), coil, inductor, Cells-Solar, CD, other, hall effect, etc. These signal type low power ECs are part of the control side. They directly Input, convert and output data, programs or signals that can induce or cause resonant commutation and/or power resonance. They are part of the basic or key elements for Opto Processing and Programming (OPP). These signal processors control but do not resonate themselves or do work.

"Power electro-converters" are primarily focused on the power content and its conversion into physical results (work) and generally involve high power electricity to or from physical energy with wave characteristics (flux, field, magnetic, radiant, sound, motion, mechanical, thermal, etc.). These ECs usually are higher power "multi-step–wave conversion+Plus other Conversions" that directly convert Electricity into Energy, Work, Force or Power. These can also involve added work, energy or power conversion steps to/from physical, mechanical, thermal or other higher power energy or force. The goals, use and purpose is more than signal level conversion action only, some added function, force or energy that is more than just low power, signals, data and usually involves work in a form other than electricity or wave energy. Examples of power electro-converters from electric to wave include: electric, motors, windings, coils, capacitors, magnets, heaters, etc. Examples of power electro-converters from wave to electric include: generators, coils, windings, solar panels, magnets, etc. These higher power type ECs are the basic or key elements for power, force, work or energy conversion and commutation and are part of the drive and output side to directly convert, commutate and resonate the load (work). These ECs are an integral part of the resonant work conversion activity.

"Opto" is used as opposed to "Optical" to show that this concept is not limited to optically based devices and spectrum only, that it is "wave or electromagnetic field" based (of which optical is a subset).

"Opto-Programming (OP)" as used in this disclosure refers to a methodology for manipulating information in the electromagnetic (e.g. optical) domain as opposed to the electrical domain. The basic technique involves converting an electrical signal to an optical signal, manipulating the optical signal in the electromagnetic (e.g. optical) domain, and then converting the manipulated signal into an electrical signal. It includes any type of signal or parameter that uses analog wave energy (optical, radiant, magnetic, acoustic, etc.) that can be altered, changed or controlled in a repeatable and predictable manner, thus making it programmable.

An "Opto-Processor (OPP)" uses signal electro-converters along with one or more opto-programs (e.g., wave, field altering graphical geometric apertures) to process or transform a signal. It captures or accepts input signals, data, vectors or programs, then processes, computes, changes, executes, this input (and others) using the OP(s) and outputs the converted new vector signal or signals e.g. the computed (changed) results. These Output Results can be in an Electric Domain (electric signal From an Electro-converter) OR can still be in an Opto (wave) Domain that then goes into another OP opto program as an input wave vector not an electric signal vector.

An "Opto-Programmed Controller (OPC)" an analog programmable circuit apparatus that includes one or more Opto Processors with at least one or more Opto Programs wherein the opto-programmed controller receives at least one input signal from at least one sensor concurrently and integrates the at least one input-signal into at least one control signal to an Opto Processor. The Opto Processor generates at least one output signal from a signal level EC device that in turn can be used to drive each controllable power electro-converter device.

One way to accomplish the basic OP concept is to convert a DC signal to a continuous optical signal, interrupt the optical signal with a rotating mask to obtain a manipulated or varying signal in the optical domain, and then convert this manipulated (altered programmed) optical signal back to an electrical signal, which is now a changed/programmed/new resultant electrical signal. In this example, the electro to optical field is static, but the graphic shapes in the optical field move and alter the optical field, as disclosed in U.S. Pat. No. 5,665,965.

Another method for converting a varying (e.g. sinusoidal, trapezoidal, vector) electrical signal (the input) to a varying optical signal (the interim programmable signal) uses a simple LED (or any electro to wave converter) to interrupt (alter, program, change) the varying optical signal with a graphical mask without rotating or moving the mask to obtain a manipulated signal, and then converts the manipulated (altered programmed) optical signal to an electrical signal. In this variation, the optical field varies, while the graphical mask remains static. However, as the optical field traverses the mask opening it is altered, programmed, as disclosed in U.S. Pat. No. 6,087,654.

In a combination of the two variations (described in U.S. Pat. Nos. 5,665,965 and 6,087,654), the optical signal can be dynamic (i.e. variable) and the graphical mask can be moved in order to effect co-manipulation of a signal in the optical domain. This affords very complex equation creation, manipulation and programming including matrix and array processing. It should be noted that opto-programming is not limited to one optical emitter and one sensor, but that multiple emitters and sensors, and indeed multiple masks may be used. This approach results in parallel concurrent multiple paths of program co-execution so 3D or even multi-dimensional computation and co-processing can be readily effected. Note that in each variation either the field moves, or the graphical shape moves to manipulate information in the optical domain.

Thus, opto-programming is not limited to a specific arrangement such as the encoders as shown in the prior art. Rather, opto-programming requires at least electromagnetic (e.g. optical) conversion, which can be accomplished by:

1—an optical emitter such as an LED,
   2—a graphical mask to manipulate the optical signal, and
   3—an appropriate sensor, such as a photo-cell for conversion of the manipulated optical signal to an electrical signal.

Similarly the "optical" elements LED and Photo-Cell could be virtually any combo of emitting and sensing wave devices that convert an electric input to a wave output (emitter) and wave input to electric output (detector). As long as this conversion can proportionally convert both the electrical to radiant wave energy from its surface and the opposite conversion of radiant wave energy on its surface to a related electrical signal out, these devices can serve as part of an OPP—Opto Programmable Processor.

"Voltage Pulse" is a specific form of signal modification or transformation employed in the present disclosure. A pulse can be any feature injected into the base signal to produce resonant characteristics in the target power device. This may include conventional Sine or pulse shapes that return to 0 or may include continuous, discontinuous, or other programmable features being introduced into the output signal.

Different from the art prior before the present disclosure, where the power controllers are purely electric in nature, the Electro-mechanical means of the present disclosure interacts with both the electrical and physical or mechanical properties of the electric powered device to effect a composite resonant action that provides unique power attributes to the entire system. This same phenomenon may be present in any power electro-converter system and be subject to the same sort of resonant control. It is the use of signal processing to provide resonant voltage pulses matched to a target power electro-converter that gives rise to the concept of controlled resonance. Controlled resonance is much more than just a new power amplifier; controlled resonance is a full system control concept that enables power conversion, control and enhancement as an amplifier does but it also includes real time signal processing, application and mathematical computation, programming, analysis and execution. Controlled resonance is a composite of numerous functions, processes and activity in a very basic simple package that elevates controlled resonance beyond just an amplifier or signal processor or motor controller. It is a full input, process, output power control system that includes many capabilities and expansions beyond prior disclosures and current art, as will be described and disclosed herein.

What a controlled resonance achieves is what a person skilled in the art may refer to as a Class "C" type amplifier mode embodiment. The "class C" moniker serves only to establish a starting point for the present disclosure, but it is not sufficient or complete enough to explain the electro-mechanical system behavior, resonant phenomenon, and modes of operation observed in practice and disclosed herein. FIGS. 8-10 illustrate the sequence of distinct steps, plots, graphs, proofs and math equations of the methods and systems that disclose this new basis for achieving a unique resonating power converter and amplifier. As this progression pf plots illustrate, the present disclosure builds from basic two dimensional (2 D) classic approaches to innovative practical three dimensional (3 D) solutions and implementations.

Figure 3B:
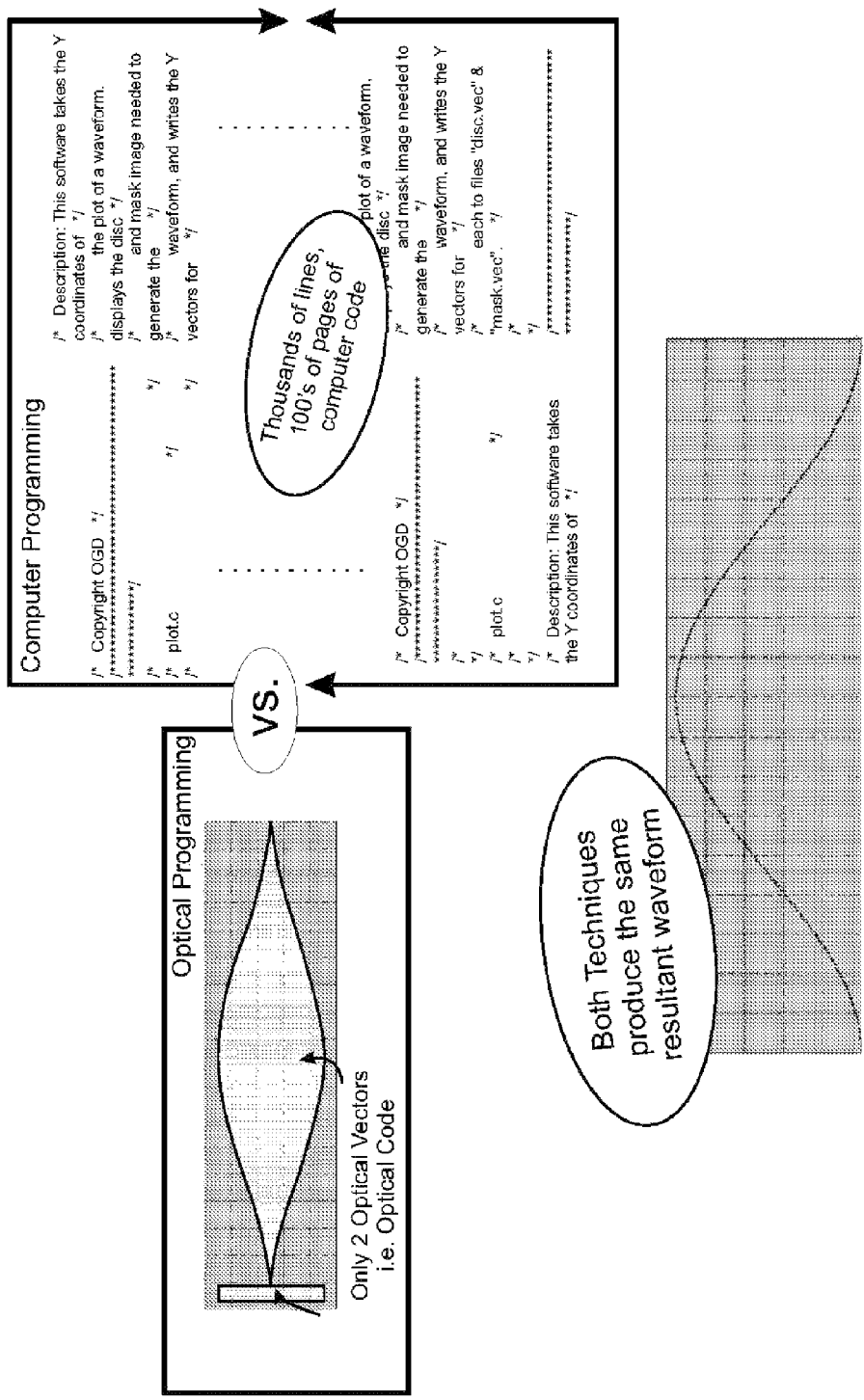
Figure 4A:
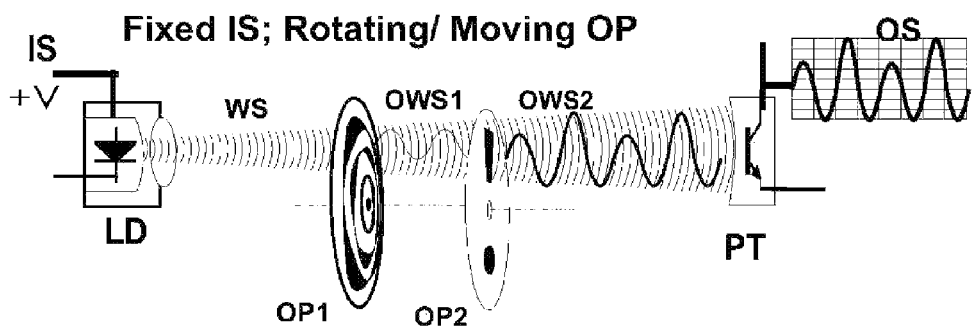
FIGS. 4A-4C are diagrams showing example prior art opto-processors using opto-programs to process various signals.
Figure 4B:
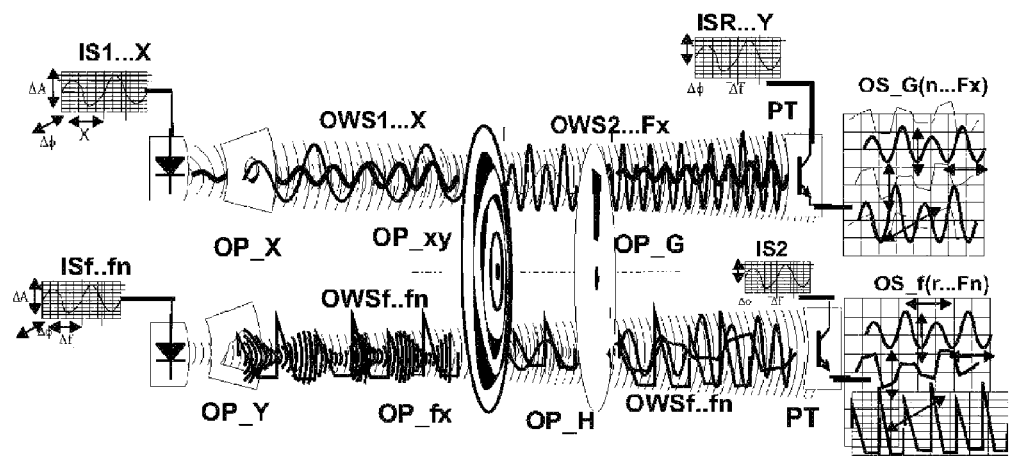
Figure 4C:
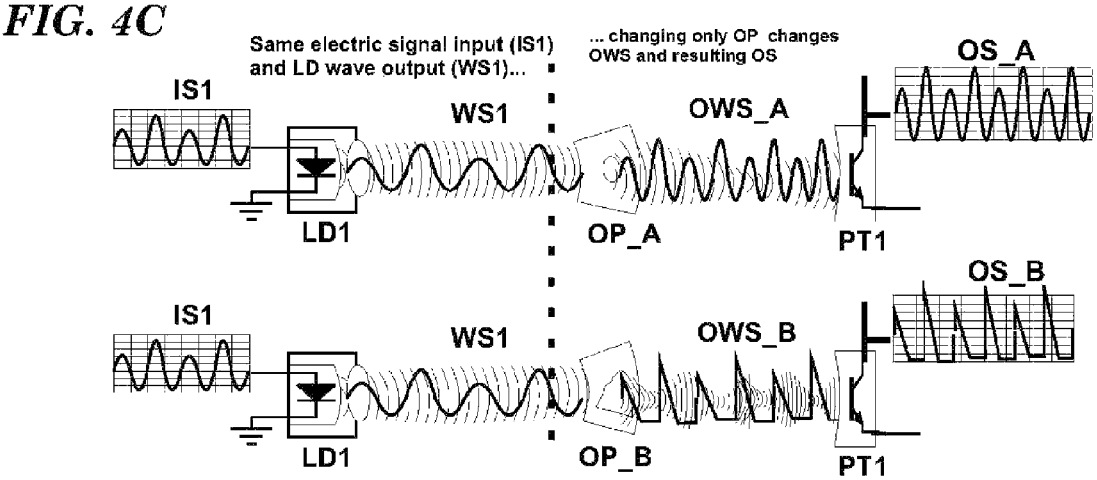

The controlled resonance device is based upon a modified implementation of OP & GP (Optical & Graphical—Programming and Processing) techniques previously disclosed. When OP & GP are combined into a physical programmed package, they are redefined as an Opto Programmed Processor—OPP. A brief summary of the application of an OPP to a resonant control system can be described as follows: it is a complete electro-mechanical physical system that achieves Multi-Input Electro Mechanical Analog Parallel Processing Control with Multiple Resonant Power Outputs by applying OP/GP methods to arbitrary power electronic devices. FIGS. 4 and 5, illustrate the OP/GP I/O aspects; FIG. 3a illustrates the processing and programming aspects, FIG. 6A illustrates a block functional diagram, FIG. 6B illustrates the flow chart and timing, FIGS. 7A, 7B illustrate an actual circuit for implementing the processing and programming aspects, and FIGS. 8A-D to FIGS. 10A-B illustrate and describe the application to motors and machines.

The above mentioned series of graphs give further evidence to the expanded and unique nature of this controlled resonance systems and methods as being much more than a traditional "Class 'C' Type" amplifier. As such, in the present disclosure, the controlled resonance refers to a quasi type but greatly enhanced Class "C" power converter as a new and enhanced "Class-GP" amplifier controller mode of resonant operation. The "GP" implies the broader nature than just "C" as the "G" =Graphic, Geometric, Generic; and the "P" =Power, Programming, Processing, defining this as more than an amplifier or processor or program. The controlled resonance is a combination of all of the foregoing combined into apparatus, systems and methods.

Despite the differences between a controlled resonance and a typicals Class C power converter, some comparisons and analogies are drawn to class C to help explain the function of a controlled resonance and the uniqueness as applied to full electric motor and machine control, commutation and power. In an application specific to motor commutation, the simplest variety of the controlled resonance device, generates discontinuous pulsed bursts, less than 50% duty-cycle power signals; meeting the definition of a Class C like requirement. FIGS. 11A-C-15A-B illustrate the types of resonant Class C like commutation signals used in a controlled resonance but the comparison to "Class C" only holds for that first given fixed frequency. The design philosophy of the controlled resonance is to combine and incorporate the actual electro-mechanical properties of the motor (rotating Induction Motor, winding flux, capacitor) and the nature of the dynamic load together, with both acting as components within its circuit electrical function with OP/GP causing, control, programming and results. A dynamic rotating induction machine is unlike a physically static, electrically tuned LRC reactive circuit where resonance for that particular circuit is defined by a basic set of equations and electrical parameters.

Electro-mechanical motor resonance is not a fixed function of frequency alone so it does not produce a single valued resonant frequency. Induction machine electro-mechanical resonance is a function of several main variables: voltage, frequency, current-voltage phase shift, motor capacitance, motor winding flux and the instantaneous motor rotating and loading conditions. Taking these factors into account, and considering their values in the circuit design philosophy, we have been able to create and control variable resonant motor commutation as a series of different pulsed voltage modes or operation. (see FIGS. 11A-C versus FIGS. 12A-C and FIGS. 13A-C). This leads to an adjustable controlled resonance controller system capable of excitation pulsing of more than one mode of sympathetic resonance as FIG. 14D and FIG. 15B both illustrate. In fact, electro-mechanical resonance is achievable at any fractional integer multiple of the fundamental motor frequency and operating speed. In theory, the set of possible resonant frequencies can be given by the equation:

$$x(f_n) := \sum_{j=1}^{\infty} \sum_{i=1}^{\infty} FundamentaFrequency \cdot \left(\frac{i}{j}\right)$$

Besides the above equation of frequency variability, FIGS. 11-15 all illustrate 2D examples of the type of commutation resonances achievable at a given line frequency of 60 Hz. Controlled resonance can be achieved at any whole integer or ratio frequency: 6 Hz, 12 Hz, 15 Hz, 20 Hz, 30 Hz, 40 Hz, 48 Hz (i.e. 1/10, 1/5, 1/4, 1/3, 1/2, 2/3, 4/5 . . . of the fundamental, and so on). It should be noted that, even though a given motor's design frequency may be 60 Hz, for example, the resonance is not bounded by, or limited to, integer divisions of this 60 Hz frequency. We have found for any "pulsed or resonant" voltage there exists an association with a fundamental frequency for which the motor will operate at resonance.

Actually, there is a series of resonant modes of that frequency, given by the equation above, at which operation can occur. This series of operating options create and define a Frequency/Voltage/Resonant/Electro-Mechanical Load (F/V/f$_o$/M) relationship for a given induction motor. Pulsing or sweeping input frequency and voltage, while maintaining a given FN relationship, proper rotational speed and mechanical load, and considering the set of all the resonant modes for the swept input frequency, we were able to achieve continuously variable, "Class C" type resonance across a wide operation range. Of course the relationship is also bounded by the physical and mechanical constraints of the motor. Further, since we potentially have control over multiple key variables like F/V/T (Frequency, Voltage, Torque), phase alignment of voltage and current may be altered. This may ultimately serve as a means of power factor/phase adjustment and correction. As FIG. 9A illustrates, there are several sets of 2D vector planes that exist and can create a number of 3D vector space relationships, some of which may be utilized to achieve power factor phase and signal correction.

AC Line Power Reflection and Grid Disturbance

Unlike traditional digital Pulse Width Modulation (PWM), a controlled resonance implementation has minimal load or system power reflection back into the line (AC grid). FIG. 1A illustrates the PWM and the signal distortions that are common for this type of digital switching and reflected into the grid as a result of the PWM implementation. As noted above, there are many other high speed high power switching issues and serious problems that are not illustrated in FIG. 1A-D but are seen by the motor, the power controller, and the power supply. Perhaps most significantly, the ac grid may be harmed as well. It is this continuous power reflection of numerous harmonics, electrical noise spikes and worse, that limit the use and value of present day PWM based systems. In contrast, with a controlled resonance powered motor in resonant operation, the power demand from the AC line occurs typically much less than ¼ of the time normally needed by other AC line connected electric motors. Also with controlled resonance, even though the load or motor power is AC (bi-directional) as illustrated in FIG. 12C and FIG. 13C, the controlled resonance controller power to the inductive load (FIGS. 11B, 12B, 13B), and most significantly the AC line or grid power (FIG. 11A, 12A, 13A), are pulsed AC or DC. As illustrated in FIG. 12 and FIG. 13, the DC pulsing may be run in positive or negative voltage resonance. As also may be seen from these power plots in FIGS. 11-15, there is a minimal amount of on-time or power line demand to maintain motor commutation when in controlled resonance. This reduced power time demand with controlled resonance allows a number of new options for AC line usage and motor commutation.

Figure 14A:
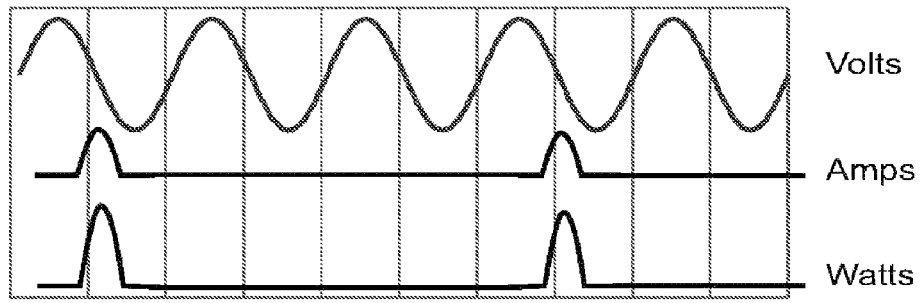
Figure 14B:
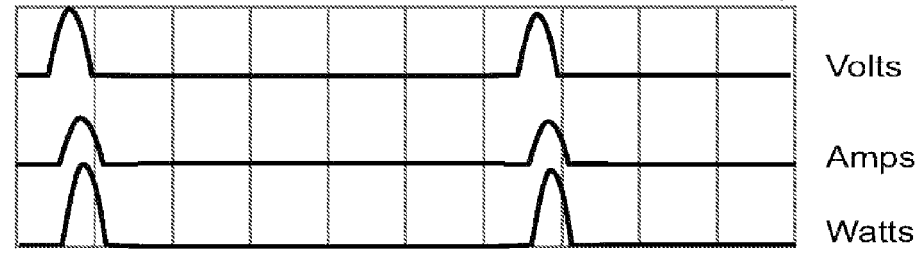
Figure 14C:
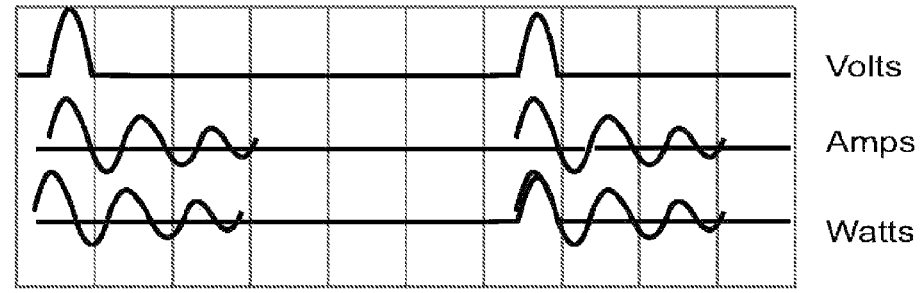
Figure 14D:
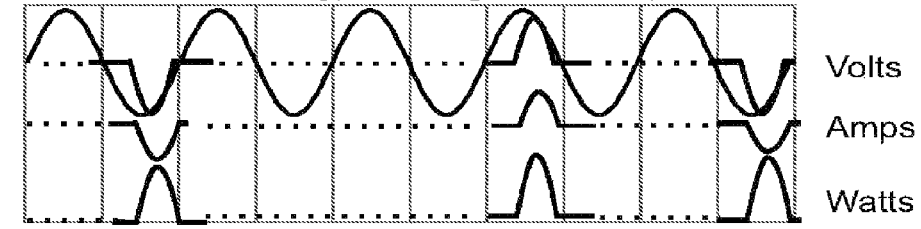

Controlled resonance reduces the demand on the input line, both through improved efficiency and overall reduced load, but also reduced reflection of system harmonic noise, high voltage spikes, switching issues, and the like. Also, the time spaced power resonant demands are so far apart in time that multiple concurrent motors can co-exist on a single controlled resonance and be successfully operated. Conversely multiple independent controlled resonance controllers could all attach to the same power line and have their signals commingle, multiplex and or heterodyne on the same AC line at the same time to concurrently drive different independent motors with the AC line frequency acting as a carrier frequency as FIGS. 14D, 15A, 15B illustrate and teach.

With PWM type controllers, a single motor at a time is operated on a single controller in order to control the motor as cross talk and interference harmonics can cause and wreak havoc on different motors being co-powered and control by a single digital controller. In contrast, FIGS. 11A-C-13A-C all illustrate signals and power from a single controlled resonance that can drive at least two or more motors. FIGS. 14A-D, 15A-B illustrate at least two or more controlled resonances on the same single line without causing reflected power issues back into the AC grid. This feature of a single controlled resonance controller (or multiple controlled resonance controllers) being able to cleanly coexist and concurrently operate on a single AC line without creating noise, harmonics and other grid issues lends usage of a controlled resonance as a device for achieving the goals currently in vogue touting a "Smart Grid".

Figure 15C:
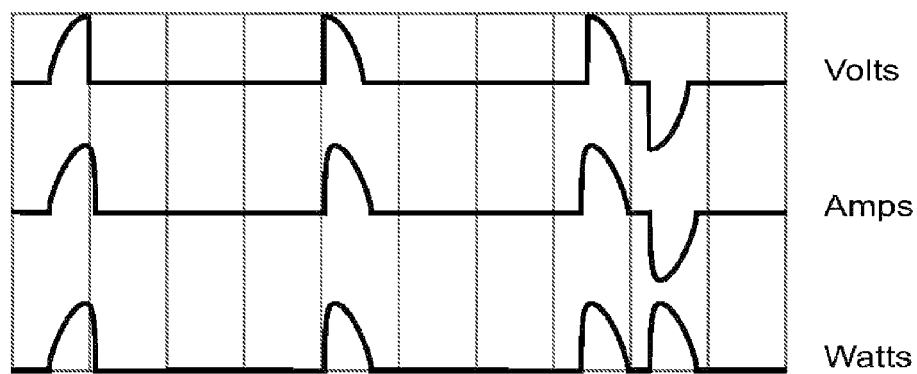
Figure 15D:
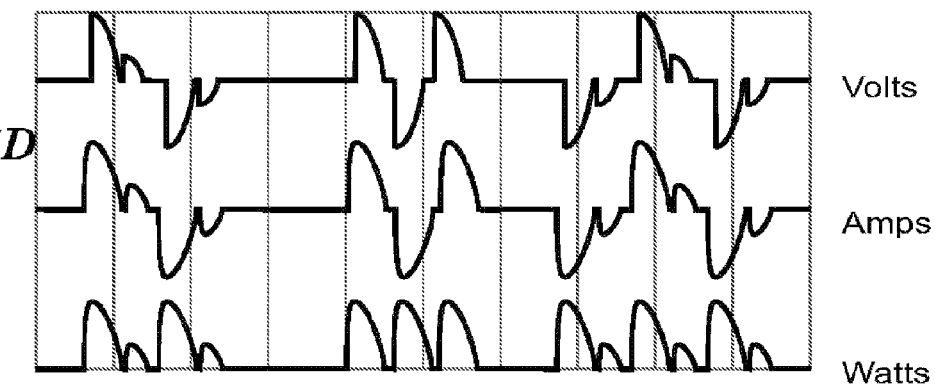

FIG. 15B illustrates that multiple controlled resonance controllers and multiple loads can intelligently and smartly share a single AC power line in such a way that multiple AC line power and line current excursions are utilized independently by their respective loads. There is no detriment to line power integrity, quality or function. There is minimal to no sacrifice in load power and there is minimal to no increase in load or AC line demand. All this makes for a very efficient and concurrent resource use, thus adding and contributing to "smart grid or intelligent grid" operation. A variety of controlled resonance configurations and topologies can be implemented to benefit the AC grid (See FIGS. 15A, B), while still achieving the goal of a motor controller (which is significant motor efficiency and performance improvement for the individual motor).

New High Efficiency Levels via 2D & 3D CONTROLLED RESONANCE Programming

When controlled resonance motor resonant commutation is engaged, very high efficiencies occur, similar to resonant Class C amplifier operation. In conditions with good load matching, optimum pulsed drive voltages, current phasing and timed drive frequencies motor efficiencies can occur that go even beyond class C operating efficiencies. In common electric Class C operation, there are practical 1$^{st}$ order electrical resonance limits as circuit components have fixed static valued parameters. In a controlled resonance powered rotating induction motor arrangement, the load (motor, device or system) not only has static electrical parameters but they also have electro-mechanical properties and are unlike the Class "C" circuit variables. Some of these electro-mechanical properties are fixed or static but others changing and dynamic. The motor possesses some fixed attributes like DC resistance, DC reactance, rotor and stator size etc, but it also possesses dynamic AC resistance, dynamic AC reactance, rotating motion that causes and changes flux, fields and more.

The magnitudes of the changing electrical component properties within a motor manifest dynamic vectors that have real and imaginary components. As FIGS. 8A-D illustrate the vector magnitude (the real and imaginary amplitude) of these dynamic electrical parameters are functions of more than one mechanical variable. The math vector plots in FIGS. 8A-D also illustrate that that there are many various ranges and combinations of vector mixing that can be achieved, used, defined or programmed that can result in a unique resonant result. This helps illustrate the vector mapping or math concepts that can be employed in a controlled resonance to program resonant action across a wide spectrum of motor operation.

Two non-electrical variables useful to controlled resonance action are rotational shaft speed and mechanical load. Depending on the load type, speed, stability and losses, there are a wide range of factors that may influence the resonant nature of the load, but generally these are known, predictable, managed or controlled and utilized. Yet, as described above, motor resonant control drive options extend well beyond simple linear or single vector control. In FIGS. 5A, 5B, 5C a multi-vector format enables creation three dimensional programming of control options. This OP/GP ability to easily and actively map, mix, combine multiple 2D vectors into 3D programmed space is what provides controlled resonance with a dynamic varied powerful motor control while keeping the cost, complexity, memory store and issues to a minimum.

The industry presently accepts standard 2-D (two dimensional) Port profile graphs as the definition of a given motor's potential performance capabilities. However, any given motor is not bounded to just 2-D but rather, there exists a set of continuous 2-D graphs where the motor could be operated. Further, the graphs would be continuous and nature and would spot a third dimension. The resulting 3-D surface is actually the true range where the motor could potentially be operated. The surface depicted in 3-D is, and should be, the accepted torque profile graphs for a given motor.

If we take a slice at 60 Hz of this 3-D surface, it produces the single, 2-D torque profiles with which everyone in the industry is familiar, as illustrated in FIG. 9A. But, looking at FIGS. 9B-D, it can be seen that with a continuous surface, the load range/torque is not specifically defined. The third dimension (frequency) in FIGS. 8C, 8D, and 9F introduces theoretically an infinite number of operation points for a given load. This continuous multidimensional motor programming is implemented through the application of optical programming and processing.

The aforementioned can be logically extended and applied to harmonics systems. In the embodiments discussed in this specification, it is clearly demonstrated that motors have the capacity to exhibit harmonic resident behavior under GP exultation drive signals.

These new methods, systems and the ability to define, model, control and operate a motor is based on newly disclosed equations that calculates, utilizes, accounts for and integrates the many motor variables into a functional math equation. FIGS. 5A, 5C, 5D, 9B-9F, 10B all illustrate plotted outputs or graphed representations of the following equation approach:

Number of poles = $p$   Line frequency = $f$   Slip % = $s$
Rotor Resistance = $R_R$   Total Resistance = $X_E$
Peak phase voltage = V   RMS Voltage $V_1 \equiv \dfrac{V}{\sqrt{2}}$ $$\tau_{s,f} \equiv \dfrac{3 \cdot R_R}{\left(\dfrac{s}{100}\right) \cdot 4 \cdot \pi \cdot \dfrac{f}{p}} \cdot \dfrac{\left[\left(\dfrac{f}{60}\right) \cdot V_1\right]^2}{\dfrac{R_R^2}{\left(\dfrac{s}{100}\right)^2} + (2 \cdot X_E)^2}$$

The above parameters and equation provide for the 2 Dimensional (2D), 3D or N D (N dimensional) examples illustrated throughout this disclosure and can also be used for any electric motor having such features and attributes.

The above equation as illustrated in FIGS. 5A, 5C, 5D, 9B-9F, 10B coupled with GP/OP methods and techniques enable transposing 2D vector mapping into 3D surface space. These take standard single 2D motor torque plots, commonly used by motor vendors to define the motor attributes, to totally new levels of function, control, power, commutation, speeds and more. In essence, the motor's electro-mechanical function can become fully programmable, accessible and more capable using OP/GP. FIGS. 8A, B, C, D illustrate a series of plots of what a resonant vector progression would be to achieve a controlled resonance implementation. FIG. 8 illustrates that there is both "a real and an imaginary" component that exists and that form the basis for resonant behavior and that this resonance is variable, broad and programmable.

Also, based on this progression of real and imaginary plotted steps, it is evident that fully variable 3D or even multi-dimensional electromechanical control can be affected by controlling the appropriate 2D vectors of the appropriate variables. This real time dynamic vector control at any point in the joint 3D space confirms that resonant commutation and control is not a singularity or static function. FIG. 9 is similar to FIG. 8 except FIG. 9 applies to a real world motor vector as opposed to an arbitrary math example. Thus, FIGS. 9A-9F reaffirm the continuous analog nature of the many systems, machines, motors and the like that are better controlled and operated by having a like analog method and means of control, commutation, powering and operating.

It is well known in the field of fluid mechanics, that the relationship of fan speed to power input for a fan system is greater than a squared relationship (e.g. ½ fan speed=¼ fan input power). Actually, according to the fan curve laws, under ideal conditions, the transfer function of power in, to shaft speed out, would approach a cubic relationship (e.g. ½ fan speed=⅛ fan input power). With other motor powered loads (compressors, pumps, conveyors, drills, cranes, etc) the load to power relationship can be linear to exponential. All the above items regardless of their actual resonant nature are still analog devices or systems. But they have a very broad analog range of operation which means they also have a potentially high ratio relationship or a wide "Q" of bandwidth for resonance. These each have unique physical and mechanical attributes that will affect the motor's resonance making it very much load dependent and dictated. This interacting dynamic bandwidth of load factors may be coupled with the proper equation and OP/GP program to fit or find the point of resonance. But this interacting very wide "Q" or broad spaced dynamic bandwidth of load factors coupled with motor mechanics leads to another controlled resonance feature.

Multiple Resonant Loads

In an example of common Class C resonance, the load is typically a tuned-tank type electronic circuit. We find a fixed, primary mode of oscillation. If one were to change the electrical circuit component parameters, a dampening of oscillation would occur and possibly terminate system resonance. In the case of controlled resonance, we observed a beneficial stability anomaly; the bandwidth or "Q" value does not possess such a precisely tuned center frequency of oscillation. Since the motor is generating a substantial amount of back Electro-motive Force (EMF) (flux, current and centrifugal force), the motor is broad and forgiving. Relatively speaking, electro-mechanical properties expand and increase the resonant operating bandwidth. It can be so broad or forgiving that, as FIG. 14C and FIG. 15B illustrate, it is possible to drive two or more independent induction machines from a single controlled resonance drive simultaneously. Even when the motor speeds are different, both motors could be co-powered by a single controlled resonance as long as each motor has a resonant operation in some proportion to each other and the base drive frequency, as FIGS. 11-15 indicate. It should be noted that this is the idea of achieving "Dual-Resonance" from each of the individual induction motors gives a huge boost to the "Smart Grid" and a much more efficient AC Grid by utilizing controlled resonance.

Hardware Implementation GP/OP Controller

FIG. 6 and FIG. 7 both illustrate examples of an actual implementation via block diagrams, flow charts and schematics of a controlled resonance apparatus. FIG. 7A is a complete system circuit implementation of an OP/GP designed controller where section f is a sub circuit that can enable the resonant drive signals for Class "GP" operation. FIG. 7B is a newer circuit subset or "daughter board circuit" that goes with the block diagram FIG. 6A and this gives a different physical embodiment of the previously disclosed approach for using OP/GP technology, applied to and providing a solution to achieve Induction Resonance.

FIG. 7B circuit represents a daughter board add-on that can be used in conjunction with an "OP/GP controller motherboard". The FIG. 7B daughter board circuit's computing power is elegantly facilitated by 6 discreet optical devices in conjunction with basic supporting logic chips. Load sensing and feedback signals are sent to the circuit, mixed together with clock and drive signals, then encoded as optical signals that can be mixed and used with other signals and parameters.

Multiple resonant choices in circuit options are provided via jumper connects that enable certain Truth Table configurations. Several variable resistor pots are used to tune or program the optoelectronic component inputs (light wave emitters) and outputs (light wave detectors) to provide a wide range of resonant operation. Besides this series of electrical tuning features, there are real-time computations performed within the optical devices, reassembled and decoded in the mixing topology and returned to the motherboards OP/GP. Here, they are again electronically encoded to optical signals, mixed and compiled in the optical domain, decoded and ultimately used to drive the controlled resonance's power amplifier section. The end result is the driving of an electro-mechanical induction machine into resonance.

Controlled Resonance's Advantages Over Other Power Controllers

Commutating an AC (Alternating Current) asynchronous machine with pulsed DC (Direct Current) signals is counter-intuitive to what an AC motor needs to operate. DC pulses usually manifest a braking force on an AC rotor and can even cause a locked rotor condition. However, this is not the case if a commutation pulsed voltage signal is computed, timed and performed quickly enough in such a way that it can cause or keep the motor commutating. Systems and methods that can sync periodic pulses with the induced collapsing field (magnetic flux) within the motor can achieve a motor resonance or constructive commutation pattern. These sync period pulses can be routed through the motor windings, capacitor and rotor. Rather than a braking effect occurring with DC voltage, the proper magnitude, syncing and use of these internal electro-mechanical elements allows internal constructive motor oscillation to occur that in turn drives and maintains synced motor rotation to winding field oscillation and continued constructive commutation.

FIGS. 8A-D and 10A-B illustrate the design of the DC pulsing vector's amplitude, phase, frequency, rates and polarity to be tuned, responsive and adaptable to the multiple motor system elements. To generate and sync real time voltage vectors and signals to this behavior demands fast, dynamic closed loop signal control. GP/OP's, real time input, circuit processing speed, dynamic real-time computation and output decision making are instantaneous within the circuit and allow the type of computational power need to make "Variable Class C" operation possible.

A motor's given operating speed and normal spec limits are the starting point for OPP commutation into Class "GP", or to be successfully driven via a controlled resonance device. The motor is electrically started via the controlled resonance device to a speed (voltage & power) in excess of the resonant threshold intended. For example, if a 1800 rpm motor is to be run at ½ speed 900 rpms it is initially "jump or kick" started to a speed in excess of 900 rpms. Once that speed is accomplished (the AC voltage level and duration is used to achieve it), the unit's circuit does several concurrent things via optoelectronic devices: the AC start circuit disables; the syncing circuit enables (what frequency, rate, pulse width); the amplitude power level (DC voltage output, positive or negative pulses) reads the input signal (or signals) and dynamically adjusts to the programmed level instructed by the real time input signal; the input signal senses and monitors the given control parameter (temperature, humidity, pressure, etc) and converts that into an electrical signal that in turn gets converted into an OP/GP Optical (wave or graphic energy) signal that in the wave or optical domain can mix with other OP/GP signals and then drive a detector that converts the OP/GP Optical signal into the appropriate power device control input. The power device then translates this into the appropriate power output.

The Figures illustrate the many steps using OP science to capture, convert, mix, compute, blend, program and output multi-dimensional vectors in a real time mode using the techniques described and implemented in the Class GP or controlled resonance solution. As can be seen in the attached Figures, complex motor torques, speeds, in both 2 dimensional vectors or 3 dimensional equations can be easily controlled, co-programmed and blended with other parameters such as temperatures, pressure, etc. It is this series of simple optoelectronic parts and their implementation that makes using OP/GP practical, powerful, flexible as well as easy and affordable over other traditional commutation and controller methods.

OP VHz Controlled Resonance Analog Electrical Controller—Theory of Operation

The following is a description of one possible embodiment of a VHz Subcircuit that includes, but is not limited to, realization of frequency division techniques utilizing discreet components only (i.e. no CMOS etc . . . ). The objective is accomplished by employment of optical/electro-components and supporting circuitry. The resultant circuit is analog in nature and continuously variable instantaneous computing. The circuit illustrated in FIG. 16 comprises two separate sub-circuits. The components to the left of the optical device 130 constitute a frequency division/multiplication sub-circuit. The components to the right of optical device 130 perform real-time system feedback, integration and optical mixing.

As can be seen by review of the various circuits, the development of the working signal voltage/current is initiated by inputs 101 and 116 which are fed with an input signal (voltage/current/power). This signal may typically be, but is not limited to, a steady-state AC input voltage. As illustrated, voltage division occurs between components 102 and 103. The voltage division components are in place to facilitate a variety of input voltages and currents. In one possible basic configuration, input voltage might typically be 120 VAC. However, adjusting these components use the same front and can provide working voltages to the circuit even with input voltages as high as 270 7V AC or even 480 VAC.

The development of steady-state small signal reference voltage is accomplished through components 105, 107, 109 and 110. The AC voltage developed across 103 is rectified by component 105 and applied to the reference voltage circuit. The rectified voltage is further voltage dropped through 107 and 109. The resultant Vref is set by the value of Zener diode 109. This regulated voltage is "simple and held" by electrolytic 110.

Supplying the transistors is accomplished by the voltage divided AC developed across 103. This voltage is applied to the transistors circuit to the parallel resistor combination 103 and 104. The parallel arrangement of these two resistors performs well to facilitate power dissipation for instances of higher input voltages. The AC voltage out of the parallel resistors 103 and 104 is rectified through diode 106.

Figure 17:
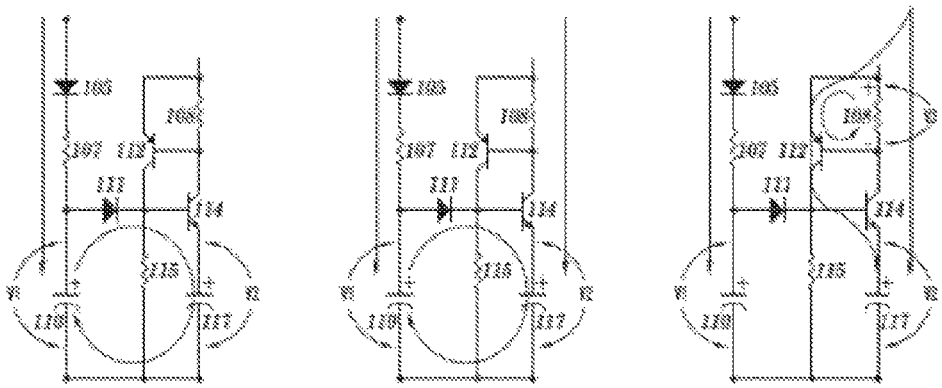

As illustrated in FIG. 17, transistors 112 and 114 are initially open. There is no bias present until capacitor 110 charges to the Zener voltage 109. Once electroytic 110 has sufficient charge the voltage on the capacitor 110 forward biases the base of NPN in transistor 114 which results in a chain reaction occurring. Since NPN transistor 114 is in conduction, several things happen simultaneously. Electrolytic cap 117 starts to slightly charge from the NPN 114 base current. The Base current through NPN 114, causes collector-emitter current to flow in NPN 114. Current flows through resistor 108, developing a voltage drop across the resistor 108 and further charging the electrolytic cap 117. With the voltage on the electrolytic cap 117 continuing to rise, the voltage across resistor 108 forward biases the PNP transistor 112. The PNP/NPN transistor configuration is now "booted"; it no longer needs NPN 114 base current for conduction. Electrolytic cap 117 continues to charge to a resultant voltage which is the result of the network of components 102, 103, 104, and transistor voltage drops described by Thevenin-Norton equivalency. The resultant voltage on Electrolytic cap 117 will become greater than the voltage on Electrolytic cap 110. At the point where the resultant voltage on the Electrolytic cap 117>the resultant voltage of the Electrolytic cap 110, NPN transistor becomes reversed biased. Since the input signal to the network is half-wave rectified (current through diode 106), the following occurs:

The current through resistors 108 goes to zero;
PNP Transistor 112 goes out of conduction;
Transistor NPN 114 is reversed biased (because of charges on the Electorlytic caps 117 & 110); and
This results in transistors 112 and 114 being open and disconnected from the circuit.

Figure 18:
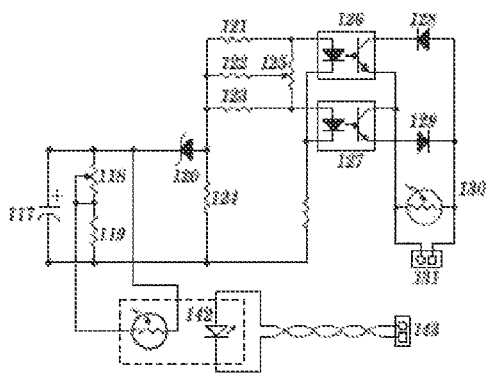

This circuit, for instance, is depicted in FIG. 18. The developed charge on electrolytic 117 is utilized to perform two separate tasks, as described below.

Fixed And Dynamic Frequency Control

Potentiometer 118, resistor 119 and Opto electric device 142 constitute a discrete series/parallel network arrangement that ultimately serves as the "R" components of an RC network. The setting of the potentiometer and the value of the input Opto control device 142 control the "time constant" associated with this RC network. An underlying feature of this network is that optically we control an RC time constant circuit, which ultimately controls the actual frequency of the power electronic circuitry. The second current bleed path goes through Zener diode 120 and develops a voltage across resistor 124. The voltage developed across resistor 124 is equal to the voltage across electrolytic capacitor 117 minus the Zener 120 voltage. The voltage value for the Zener diode 120 is chosen such that when the "R" components of the above RC circuit are in their normal values, the voltage across resistor 124 goes to zero for 50% of the duty cycle. This is the median setting and facilitates the potentiometer 118 and/or Opto 140, 226 in the middle and easily increases or decreases the time constant frequency. "Flat-lining" the voltage across resistor 124 also safeguards against "trickle current" misfiring the Opto-couplers 126, 127.

Driving The Opto Couplers 126 and 127

The voltage developed across resistor 124 is tied to resistors 121, 122, 123. Balancing potentiometer 125 is used to adjust for components tolerances and accommodate one of three fundamental modes of operation.

1. Standard, balance, symmetrical frequency division and multiplication;
2. asymmetrical frequency division and multiplication, which may be useful for asymmetric non-linear loads, such as compressors, pumps, etc.; and
3. Class GP operation-single sided having complete asymmetry.

Final Output Stage

The particular Opto devices 126 and 127 shown in the circuitry are for illustration purposes only. In practice, it has been found that a variety of devices can be implemented. For example, a non-limiting list of devices are:

1. Standard BJT type single junction Opto Couplers;
2. Darlington type BJT Opto Couplers;
3. CAD Sulfide cell/LED combination devices;
4. A multi-CAD cell, single LED; and
5. Multi LED, single CAD cell.

The outputs of these optical devices only connect rectally to high voltage power electronic drive circuitry. Diodes 128 and 129 are needed to:

1. Protect the devices from ESD;
2. Block the reverse voltage condition; and
3. Increase circuit stability and longevity.

Figure 19:
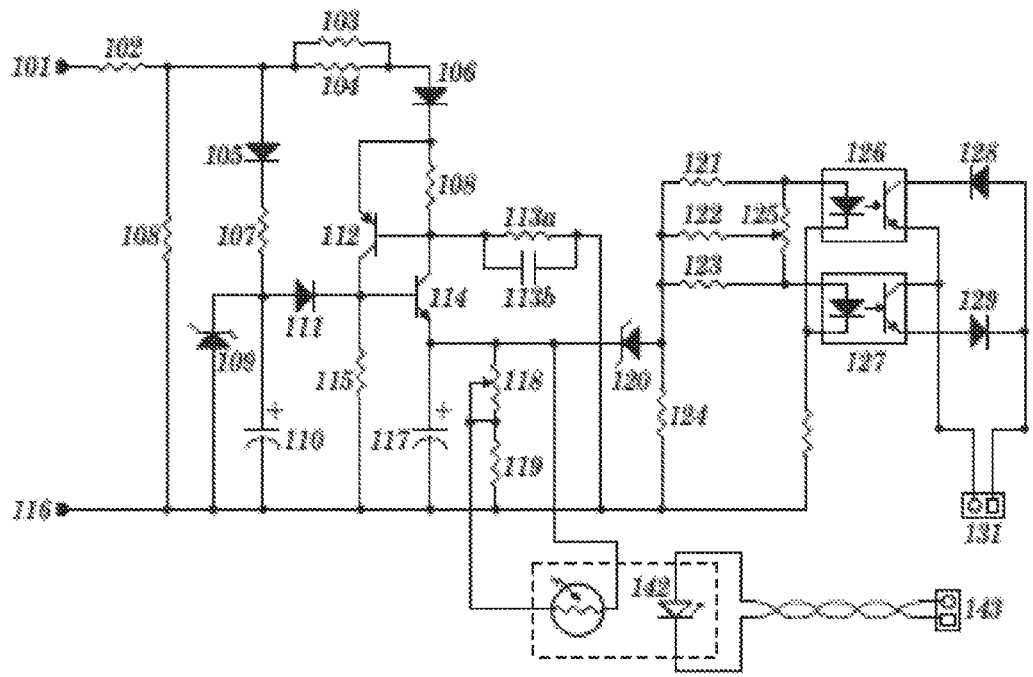

The disclosed circuit up to this point can now accurately be represented by the following extract from the compete schematic, as illustrated in FIG. 19.

Figure 20:
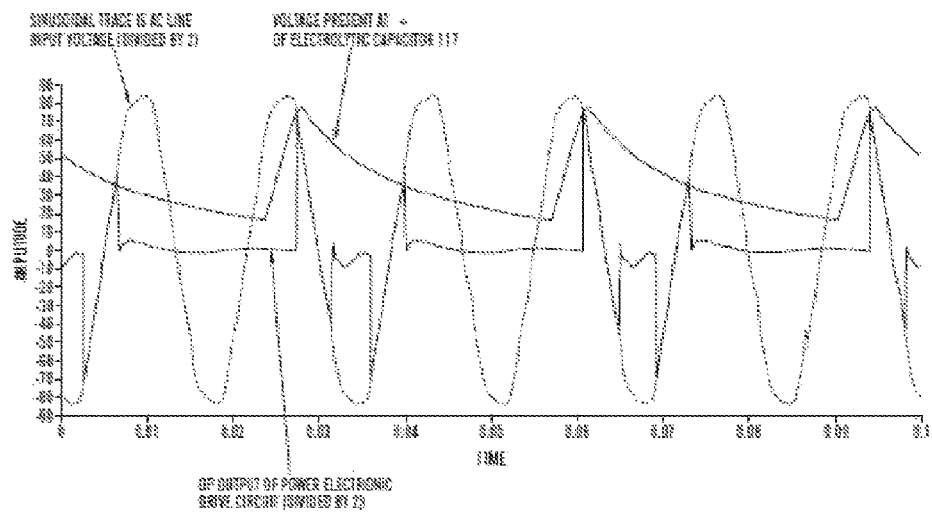
FIGS. 20-22 are plots capturing the output of the circuits for controlled resonance in accordance with the present disclosure.
Figure 21:
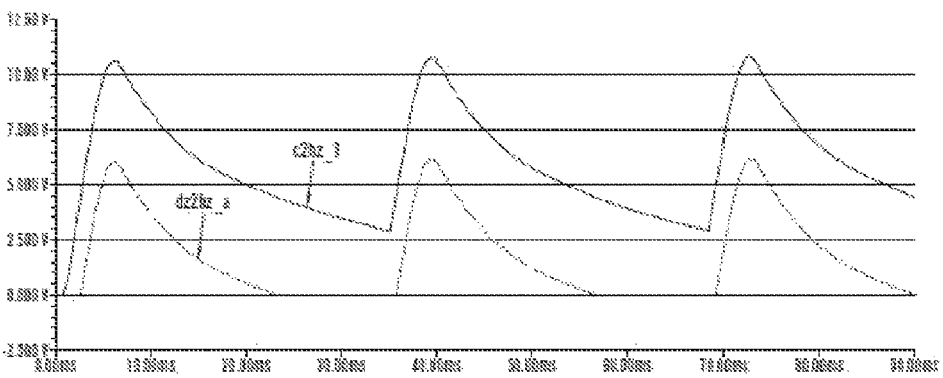
Figure 22:
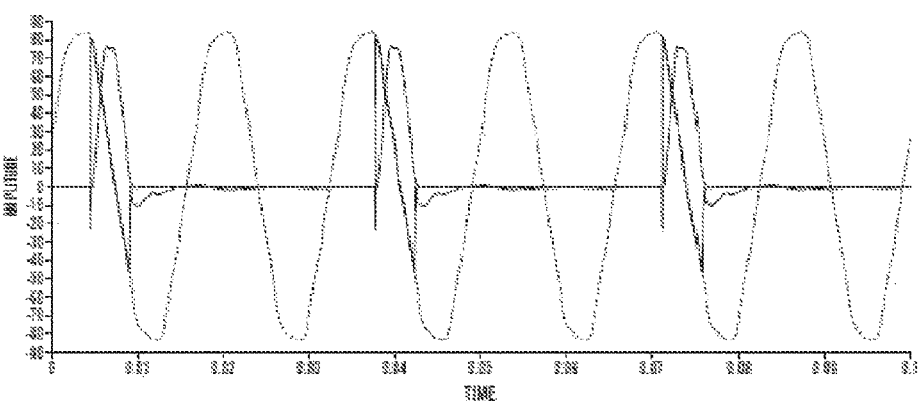
Figure 24:
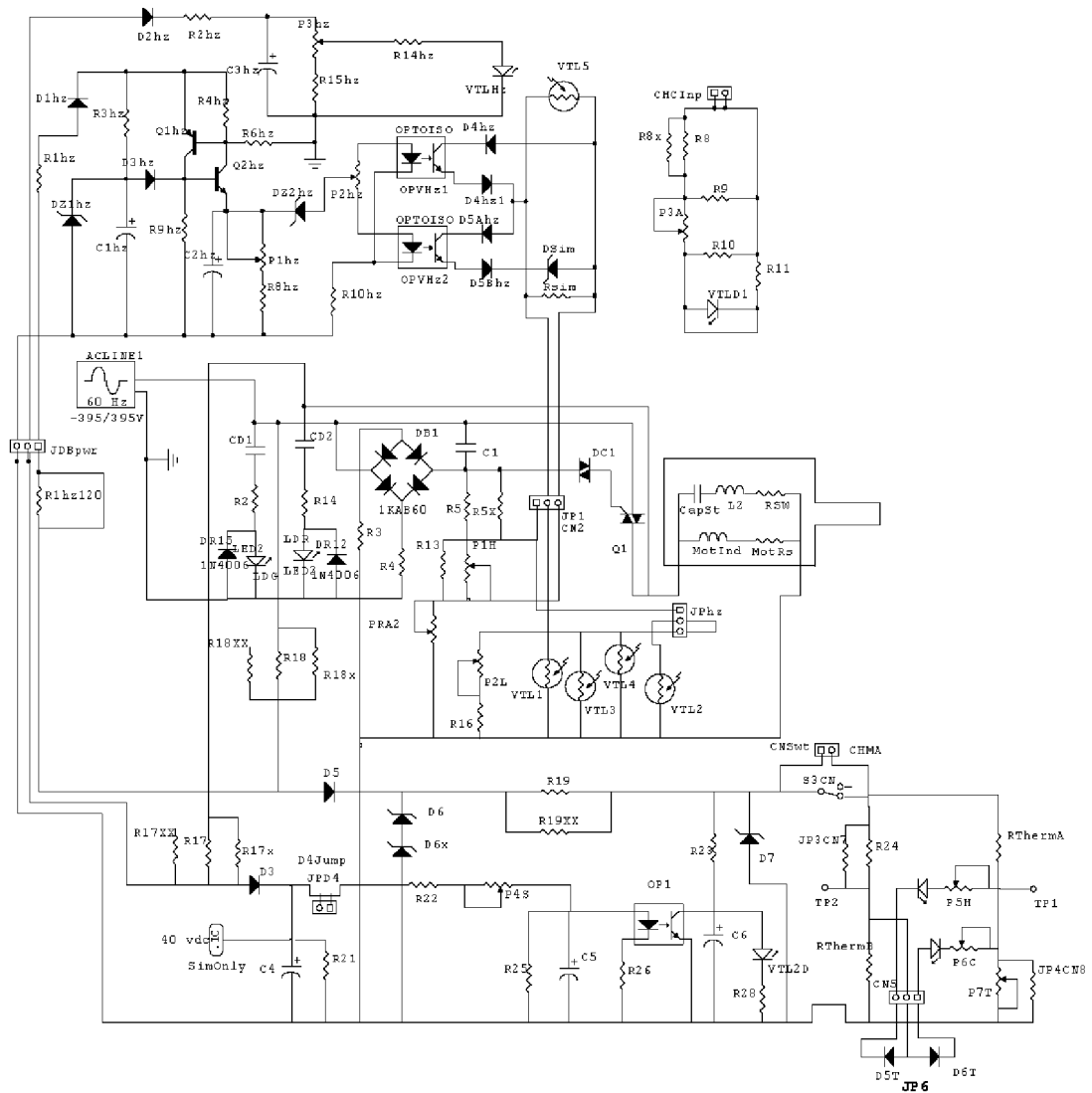

FIG. 20 is a capture from LABVIEW™ software. There are three plots shown in this capture, plots were all scaled to values where superposition of the signals could nicely illustrate circuit function and concept.

1. G=sinusoidal trace is AC line input voltage (divided by 2)
2. R=OP output of power electronic drive circuit (divided by 2)
3. B=voltage present at "+" of electrolytic capacitor 117

From this capture, three primary features may be seen, as illustrated in the Figures:

1. The fundamental frequency of the input voltage is clearly divided by 2 on electrolytic cap 117;
2. The RC time constant behavior; and
3. The phase-delay relationship between the line frequency and control voltage developed at "+" of Electrolytic 117.

Component Theory Of Operation

Figure 16:
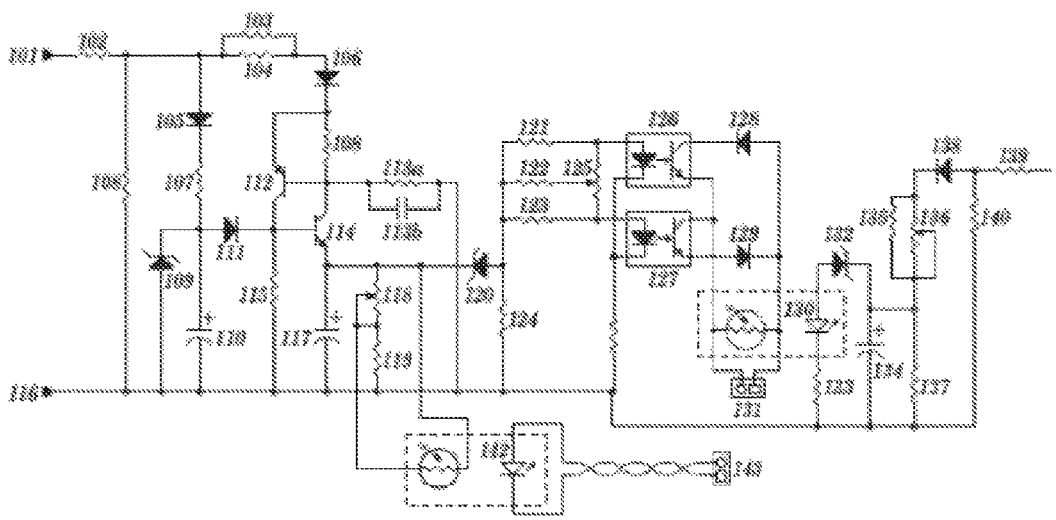
FIGS. 16-19 and 23-24 are circuit diagrams of processors and controllers for controlled resonance in accordance with the present disclosure.
Figure 23:
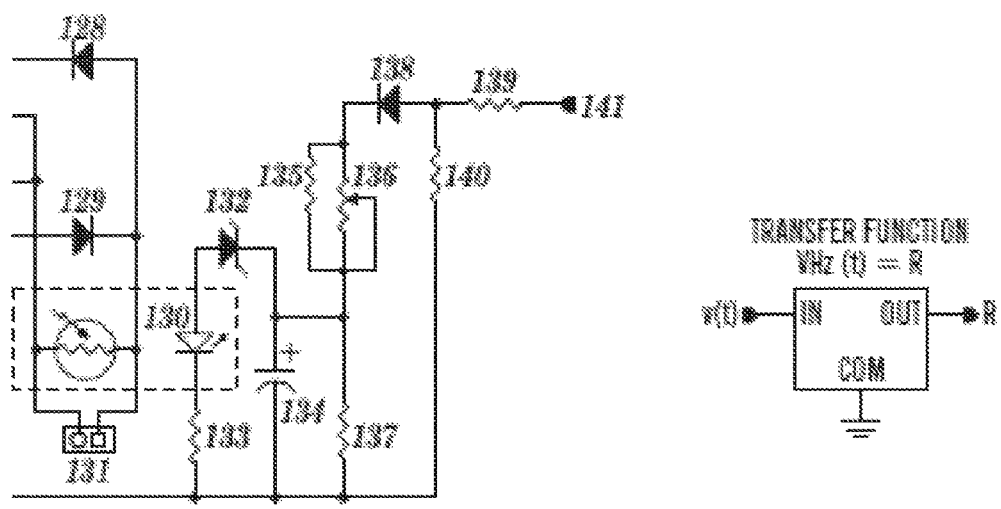

As illustrated in FIG. 23, the schematic shown therein is an outtake of the complete schematic from FIG. 16. It illustrates the second optical processor section of the circuit. The purpose of this circuit is to provide an optically coupled, closed-circuit feedback topology where the optical signal is mixed or "co-programmed" with the optical devices from the previously disclosed first stage.

The CAD cell component of the optically programmed device 130, is placed in parallel across the opto's blocking diodes from the previous stage, 128 & 129. The sum of these optically programmed signals is mixed, co-programmed and connected to the main controller through the connector 131. The main AIA controller's output is routed to this second stage circuit through connector 141. Resistors 139 & 140 set up a voltage divider. Resistor 140's value can be scaled, serried or paralleled to accommodate a wide range of input voltages. The divided voltage at the 139 & 140 node is passed through diode 138, where it is ½ wave rectified. The cathode side of diode 138 feeds this voltage divided/½ wave rectified signal to voltage adjust circuit components 135, 136, 137. This settable voltage is integrated in electrolytic cap 134. Zener diode 132 subtracts Zener voltage from the integrated voltage stored in electrolytic cap 134. The current/voltage at the anode of Zener 132 is fed to the LED component of the optical device. Resistor 133 serves as a current limiting resistor. What ultimately occurs as a result of this circuit, maybe be stated as follows:

The OP subcircuit converts an input voltage to an optically programmed corresponding output resistance where:
V(t)=the output of the power system;
VHz(t)=System transfer function; and
R=corresponding output optically computed resistance.

INDUSTRIAL APPLICABILITY

Controlled resonance in electrical power devices as described herein has clear industrial application in at least the control of electrical power devices, such as AC motors, used in many industrial applications.

The invention claimed is:

1. An analog electrical control system, comprising:
a programmed signal processor for generating an output control signal from at least one input electrical signal, wherein the output control signal is generated from the at least one input electrical signal by the programmed signal processor to include a plurality of resonant control parameters for a target power device receiving the output control signal;
wherein the programmed signal processor is an opto-processor executing an opto-program including a plurality of multi-dimensional profiles and at least one graphic pulsed resonance feature within the plurality of multi-dimensional parameter profiles to generate the plurality of resonant control parameters for the target power device.

2. The analog electrical control system of claim 1, wherein the programmed signal processor injects periodic voltage pulses into the output control signal inducing a collapsing field in the target power device for each of the plurality of resonant control parameters to achieve and maintain resonance of the output control signal and operation of the target power device.

3. The analog electrical control system of claim 1, wherein the plurality of multi-dimensional parameter profiles includes at least 3 dimensions.

4. The analog electrical control system of claim 1, wherein the plurality of multi-dimensional parameter profiles includes multiple concurrent inputs defining at least one control output signal.

5. The analog electrical control system of claim 1, wherein the plurality of multi-dimensional parameter profiles includes at least one input defining multi-dimensional control output signals.

6. The analog electrical control system of claim 1, wherein the programmed signal processor is an opto-programmed controller wherein the output control signal provides power to the target power device.

7. The analog electrical control system of claim 1, wherein the opto-program includes graphical control of at least one characteristic of the plurality of multi-dimensional parameter profiles selected from the following: amplitude, frequency, timing, phase, vectors, shapes, and events.

8. The analog electrical control system of claim 1, wherein the graphic pulsed resonance feature of the opto-program generates periodic voltage pulses in the output control signal with resonant frequency and amplitude for at least one of the plurality of resonant control parameters.

9. The analog electrical control system of claim 1, wherein the input electrical signal is direct current and the opto-program includes graphical control of variable positive and negative excursions applied to the input electrical signal using amplitude and frequency modulation.

10. The analog electrical control system of claim 1, wherein the programmed signal processor further comprises a sensor signal input for receiving a controllable device condition and integrating the signal input into closed-loop control of the target power device.

11. The analog electrical control system of claim 10, wherein the controllable device condition has an operating range with a minimum value and a maximum value, in which the programmed signal processor automatically varies the output control signal based on the sensor signal input to maintain resonance with at least one resonant control parameter for the target power device.

12. The analog electrical control system of claim 1, wherein the plurality of resonant control parameters include resonant characteristics of the target power device and a load on the target power device.

13. The analog electrical control system of claim 1, wherein the plurality of resonant control parameters include demand characteristics of the input electric signal.

14. The analog electrical control system of claim 1, wherein the output control signal controls a plurality of target power devices to achieve and maintain resonance using a common input electrical signal and wherein each of the plurality of target power devices have different resonant control parameters.

15. The analog electrical control system of claim 1, wherein the programmed signal processor includes at least one programmable duty cycle amplification feature that uses less than 50% power of the input electrical signal to generate the output control signal to drive a greater than 50% duty cycle of the target power device.

16. The analog electrical control system of claim 15, wherein the at least one programmable duty cycle amplification feature includes options for integer, non-integer, fractional, partial, and greater than input frequency division of an input frequency of the input electrical signal.

17. The analog electrical control system of claim 1, wherein the target power device is at least one of the following: an electric motor, an induction heater, a resistance heater, a light source, a wave generator, a field generator, an electric generator, a transformer, an inductor, a capacitor, and an energy storage device.

18. The analog electrical control system of claim 17, wherein the target power device is an electric motor and the programmed signal processor uses the plurality of resonant control parameters to control the electric motor for at least one of the following outcomes: torque control, speed control, power control, energy efficiency, load characteristics, and event response.

19. The analog electrical control system of claim 18, wherein the programmed signal processor is programmed using a mathematical model of the electric motor including the following parameters in a defined relationship: number of poles, motor input signal, rotor slip factor, peak phase voltage, root mean square voltage, rotor resistance, stator resistance, rotor reactance, stator reactance, total resistance, and total reactance.

20. The analog electrical control system of claim 18, wherein the programmed signal processor is programmed using a mathematical model of the electric motor using the following equation for AC motor modeling:

$$\tau_{s,f} \equiv \frac{3 \cdot R_R}{\left(\frac{s}{100}\right) \cdot 4 \cdot \pi \cdot \frac{f}{p}} \cdot \frac{\left[\left(\frac{f}{60}\right) \cdot V_1\right]^2}{\frac{R_R^2}{\left(\frac{s}{100}\right)^2} + (2 \cdot X_E)^2}.$$

21. An electrically connected power device, comprising:
an electrical input;
a device load;
a power electro-converter driving the device load; and
a programmed signal processor for controlling the device load using the electrical input and the power electro-converter, wherein the programmed signal processor injects periodic voltage pulses into the power electro-converter to induce a collapsing field for each of a plurality of resonant control parameters to achieve and maintain resonance of the power electro-converter.

22. The electrically connected power device of claim 21, wherein the programmed signal processor is an opto-processor executing an opto-program including a plurality of multi-dimensional parameter profiles and at least one graphic pulsed resonance feature within the plurality of multi-dimensional parameter profiles to generate the plurality of resonant control parameters.

23. An opto-programmed controller, comprising:
an electrical signal input;
a control signal output;
an opto-processor; and
an opto-program for generating an output control signal from at least one input electrical signal, wherein a plurality of multi-dimensional parameter profiles and at least one graphic pulsed resonance feature within the plurality of multi-dimensional parameter profiles generates a plurality of resonant control parameters for a target power device receiving the output control signal.

24. The opto-programmed controller of claim 23, wherein the opto-processor injects periodic voltage pulses into the output control signal inducing a collapsing field in the target power device for each of the plurality of resonant control parameters to achieve and maintain resonance of the output control signal and operation of the target power device.

* * * * *